US011669536B2

(12) United States Patent
Noguchi

(10) Patent No.: US 11,669,536 B2
(45) Date of Patent: Jun. 6, 2023

(54) INFORMATION PROVIDING DEVICE

(71) Applicant: JAM CORPORATION, Tokyo (JP)

(72) Inventor: Sumio Noguchi, Tokyo (JP)

(73) Assignee: JAM CORPORATION, Tokyo (JP)

( * ) Notice: Subject to any disclaimer, the term of this patent is extended or adjusted under 35 U.S.C. 154(b) by 303 days.

(21) Appl. No.: 16/271,291

(22) Filed: Feb. 8, 2019

(65) Prior Publication Data

US 2019/0171637 A1 Jun. 6, 2019

Related U.S. Application Data

(63) Continuation of application No. PCT/JP2017/028613, filed on Aug. 7, 2017.

(30) Foreign Application Priority Data

Aug. 8, 2016 (JP) .............................. JP2016-155707

(51) Int. Cl.
*G06F 16/00* (2019.01)
*G06F 16/248* (2019.01)
(Continued)

(52) U.S. Cl.
CPC .......... *G06F 16/248* (2019.01); *G06F 3/0484* (2013.01); *G06F 16/24578* (2019.01);
(Continued)

(58) Field of Classification Search
None
See application file for complete search history.

(56) References Cited

U.S. PATENT DOCUMENTS 6,006,225 A * 12/1999 Bowman ............. G06F 16/2428
707/999.005
7,359,896 B2 * 4/2008 Torigoe ................. G06F 16/951
(Continued)

FOREIGN PATENT DOCUMENTS

JP H11-45249 A 2/1999
JP H11-45250 A 2/1999
(Continued)

OTHER PUBLICATIONS

International Search Report for corresponding International Application No. PCT/JP2017/028613, dated Oct. 31, 2017 (3 pages).
(Continued)

*Primary Examiner* — Farhan M Syed
(74) *Attorney, Agent, or Firm* — Osha Bergman Watanabe & Burton LLP

(57) ABSTRACT

Provided is an information providing device capable of outputting provided information reflecting user's needs even if the user conducts information search on the basis of a query which is on the basis of an unspecific desire. The information providing device is configured with a computer system and outputs provided information in response to input of a query. The information providing device includes storage means that stores the query being composed of at least one property and provided information, rating means that rates the provided information on the basis of the query, and output means that outputs the provided information rated by the rating means in response to the query inputted.

12 Claims, 27 Drawing Sheets

(51) Int. Cl.
*G06F 3/0484* (2022.01)
*G06F 16/903* (2019.01)
*G06Q 30/02* (2023.01)
*G06F 16/2457* (2019.01)
*G06Q 30/0601* (2023.01)

(52) U.S. Cl.
CPC ....... *G06F 16/90335* (2019.01); *G06Q 30/02* (2013.01); *G06Q 30/0625* (2013.01)

(56) References Cited

U.S. PATENT DOCUMENTS

| | | | |
|---|---|---|---|
| 9,390,695 B2* | 7/2016 | Cartwright | G10H 7/02 |
| 2002/0024532 A1* | 2/2002 | Fables | G06F 16/9535 |
| | | | 707/999.104 |
| 2005/0004902 A1* | 1/2005 | Torigoe | G06F 16/951 |
| 2005/0038866 A1* | 2/2005 | Noguchi | G06F 16/951 |
| | | | 709/217 |
| 2006/0085391 A1* | 4/2006 | Turski | G06F 16/907 |
| 2008/0133479 A1* | 6/2008 | Zelevinsky | G06F 16/3325 |
| 2016/0133240 A1* | 5/2016 | Cartwright | G06F 16/683 |
| | | | 84/601 |

FOREIGN PATENT DOCUMENTS

| | | |
|---|---|---|
| JP | 3501799 B2 | 3/2004 |
| JP | 2005-025525 A | 1/2005 |
| JP | 2006-127525 A | 5/2006 |
| JP | 2012-103854 A | 5/2012 |
| JP | 5561842 B2 | 7/2014 |
| JP | 5835754 B2 | 12/2015 |
| JP | 2016-503212 A | 2/2016 |

OTHER PUBLICATIONS

Office Action issued in corresponding Japanese Patent Application No. 2018-533459 dated Oct. 19, 2021 (10 pages).

Decision of Refusal issued in corresponding Japanese Application No. 2018-533459 dated Apr. 26, 2022 (7 pages).

Trial Decision issued in corresponding Japanese Patent Application No. 2018-533459 dated Mar. 10, 2023 (83 pages).

* cited by examiner

INFORMATION PROVIDING DEVICE

CROSS-REFERENCE TO RELATED APPLICATIONS

This application is a continuation of International Application No. PCT/JP2017/028613, filed on Aug. 7, 2017, which claims priority to Japanese Patent Application No. 2016-155707, filed on Aug. 8, 2016. The entire content of the International Application is incorporated herein by reference.

BACKGROUND

The present invention relates to an information providing device that is configured with a computer system, processes a query inputted thereto, and outputs provided information as a result of the processing.

Today, with the advance of information networks as typified by the Internet, portable information processing terminals as typified by smartphones, and the like, users from various backgrounds have come to be able to access a huge amount of information, regardless of whether the users are male, female, young, or old and of whether or how much they are knowledgeable or experienced about information technology (IT). On the Internet, information providing services are provided which extract information that a user needs from a huge amount of information in cooperation with a WWW server and output the information to the user's information processing terminal (hereinafter referred to as a user terminal) equipped with a browser. Such information providing services include a well-known search site or an on-line store (or an online shopping mall, but hereinafter referred to as an online-store). A search site allows a user to search for a wide variety of information comprehensively, and an online-store outputs a list of information on merchandise reflecting the request of the user among vast varieties of merchandise, and ultimately guides the user to a Web page for carrying out a procedure of purchasing the piece of merchandise selected from the list. Furthermore, a key component (hardware and software) of a computer system providing a user with an information providing service (hereinafter referred to as an information providing device) includes a database and a search engine.

As is well known, for the database, a large-scale storage device is prepared and enormous amounts of information stored in the storage device are managed so that they can be easily searched or accumulated. Then, the information providing device accumulates and manages the contents and addresses of the enormous amounts of information, that is, information that users may ultimately want to access, or information that serves as a clue for accessing the ultimate information, such as the address of the information (hereinafter such kinds of information are referred to as provided information).

The search engine makes an inquiry to the database using a search query received from a user terminal, generates a web page of a list of provided information related to the query, and returns the web page as search results. Then, if the user finds provided information that they want to acquire in the list of provided information presented as the search results, the information providing service allows the user to specify a hyperlink (hereinafter referred to as a link) to the provided information on the browser and to browse the provided information on the browser of the user terminal.

Due to not only improvement in the performance of hardware itself, but also modification of a search algorithm and contrivance of a data storage structure of the database, recent search engines have come to be able to: retrieve the same provided information from fuzzy search keywords or synonyms (such as "digital camera" and "Digi-cam") as a matter of course; extract word-by-word search keywords from inputted natural text by interpreting the context of the text; analyze matters such as the proximity of search keywords in the body of a web page; and determine the order of presenting the search results in the list according to the appearance frequency of the keyword.

Further, the inventor of the present invention found a problem in the information providing service described above. Specifically, even if the same search keyword is used to search for information, users may have different search purposes depending on their various backgrounds. In other words, the search engine searches vast varieties of information, ranging from day-to-day life information to technical and professional information such as academic papers, and even if different users give the same search keyword to the search engine, the users do not necessarily want the same information. In view of such a problem, the inventor of the present invention invented and then granted a patent for an information search assist device capable of presenting information needed by a user accurately from vast varieties of information searched with a very common search keyword. See Japanese Patent No. 3501799. Further, technologies related to the present invention are described in Japanese Patent No. 5561842 and Japanese Patent No. 5835754. The technologies described in these patent literatures are capable of presenting how pieces of provided information presented on the basis of a query are related to the query by means of the order of presenting the pieces of provided information, or capable of letting the user know the characteristics of the presented provided information by additionally presenting the characteristics of the provided information along with the provided information.

SUMMARY OF THE INVENTION

The fact that there is an environment where various users can access enormous amounts of information does not mean that all the users are equally able to acquire intended information from the enormous amounts of information using their user terminals. Certainly, the technologies described in the above patent literatures can provide useful information by, for example, presenting a route to the intended information, generating and providing the characteristics of provided information according to a query, or determining the presentation order by rating pieces of provided information on the basis of the characteristics of the pieces of provided information. However, as described earlier, now that users of information technology (IT) are from very different backgrounds, some users cannot understand the meaning of various types of information presented in the process of reaching the information or follow the procedure of reaching the information, or some users cannot understand even the relevance between their own query and the presentation order or characteristics of pieces of provided information.

As an instance, a case is described here where a user wants to purchase a digital camera at an online-store on the Internet. The user may have an unspecific desire of "wanting to take clear pictures," but may completely lack the knowledge of terms or details of various technologies for taking clear pictures (such as "image stabilization methods," "types of image sensors," "the number of pixels," and "data compression methods"). Assume that such a user makes an information search by entering, as a query, natural text such as "clear images with a digital camera" or keywords such as "high quality AND digital camera." Then, even if "image stabilization" and its methods are presented on a selection screen or the like as information acceptable as the next query, the user may not understand the differences between the methods of image stabilization function or even why "image stabilization" itself is involved in "clear pictures." In short, not all users have the knowledge to understand the contents of the provided information presented. Thus, the conventional information search technologies fail to present provided information useful to a user if the user has poor understanding of the provided information (such as merchandise knowledge). In other words, a user with poor understanding of provided information cannot determine the usefulness of the provided information presented.

Thus, the present invention has a main object to provide an information providing device capable of outputting provided information reflecting potential needs of a user even if the user makes an information search with a query on the basis of an unspecific desire.

An aspect of the present invention for achieving the above object is an information providing device that is configured with a computer system and outputs provided information in response to input of a query, the information providing device comprises:

storage means that stores the query being composed of at least one property and provided information;

rating means that rates the provided information on the basis of the query; and output means that outputs the provided information on the basis of the rating by the rating means.

Another aspect of the present invention is an information providing device that is configured with a computer system and outputs provided information in response to input of a query, the information providing device comprises:

storage means that stores the query being composed of at least one property and provided information;

extraction means that extracts the provided information on the basis of the query; and output means that outputs the provided information extracted by the extraction means.

The present invention may also provide an information providing device that is configured with a computer system and outputs provided information in response to input of a query, the information providing device comprising:

storage means that stores the query being composed of at least one property and provided information;

rating means that rates the provided information on the basis of the query inputted as a rating query;

extraction means that extracts the provided information on the basis of the query inputted as an extraction query; and output means that outputs the provided information extracted by the extraction means on the basis of the rating by the rating means.

The present invention may provide an information providing device according to any one of the information providing devices above, in which the output means outputs, if deemed necessary, information used in the course of outputting the provided information.

The information providing device of the present invention can output provided information reflecting needs of a user even if the user makes an information search with a query on the basis of an unspecific desire. Other advantageous effects will be disclosed in the following descriptions.

DETAILED DESCRIPTION OF EMBODIMENTS

Technical Idea of the Present Invention

Figure 1:
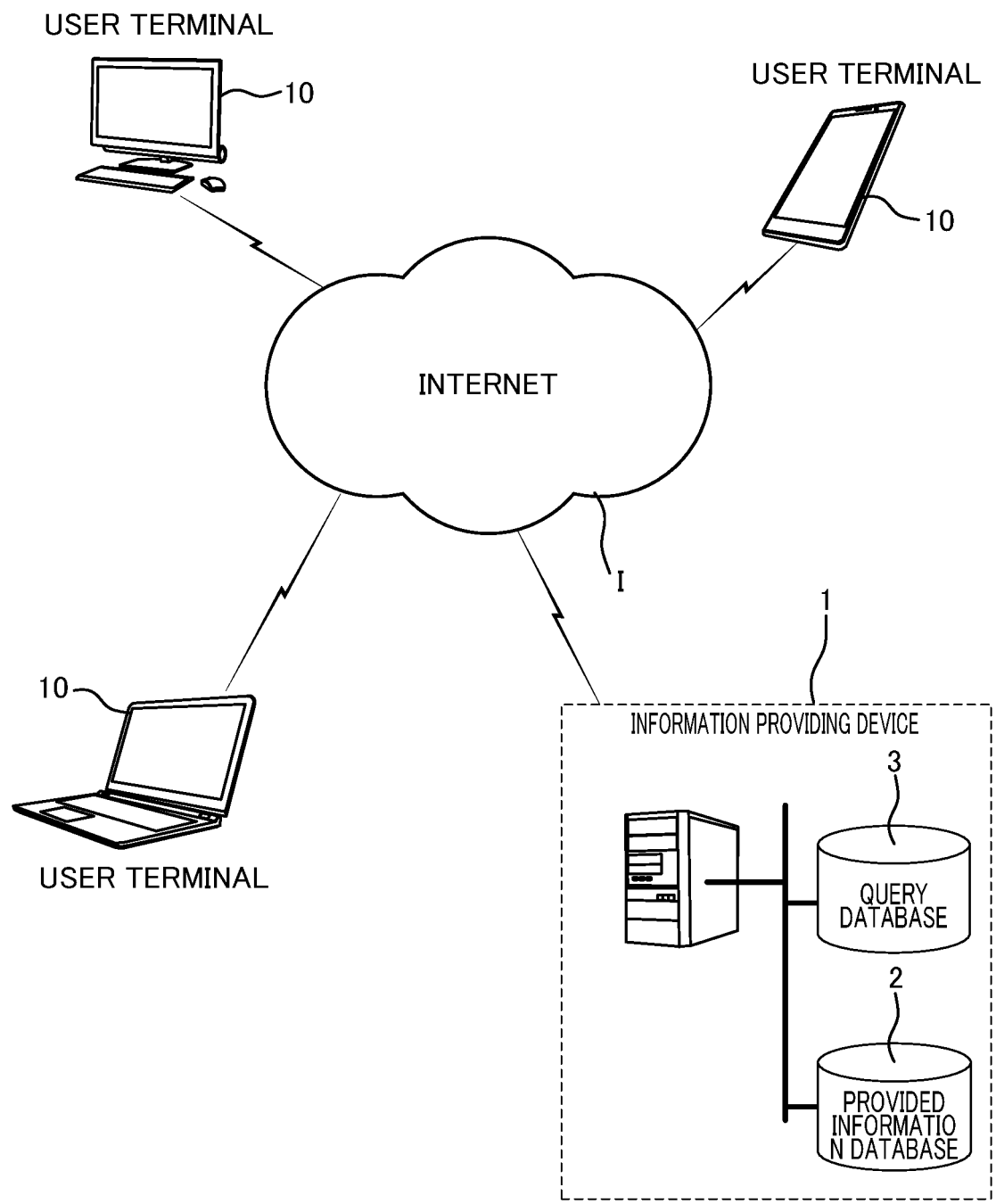
FIG. 1 is a diagram illustrating a network configuration including an information providing device according to an embodiment of the present invention.

An information providing service is provided on the basis of a query inputted by a user from their user terminal. A query is input information that a user intentionally chooses or selects, and information providing services provided by conventional information providing devices assume that a user understands the relation between a query and provided information presented on the basis of the query. In other words, conventional information providing devices implicitly assume that when some pieces of provided information are presented on the basis of a query made by a user, the user can determine the usefulness of the pieces of provided information on their own. However, now that users from different backgrounds use the information providing service, it is necessary to assume that it may be difficult for some users to choose or select a query that accurately expresses their request or to determine whether provided information presented is useful to them.

Meanwhile a person with specialist knowledge, an experienced person, or a creator of provided information (such people are hereinafter referred to as an expert) understands (or has experienced) what kind of query needs to be presented, chosen, or selected in order to obtain desired provided information, such as a user's needs (a query) and the characteristic of provided information, and understands what kind of property meets the needs (query) of the user on the basis of the user's needs and an effect brought about by a property of the provided information. Thus, if the knowledge of such a person can be interposed in an information search procedure performed by a user who cannot understand the relation between a query and provided information, provided information presented as a result of the information search is likely to include information that meets the potential request of the user even if the user does not have the knowledge or understanding of the provided information.

In view of the above, the inventor of the present invention has come up with an idea of linking the purpose or desire of a user hidden in a query received from the user to provided information by using the knowledge of an expert as a medium intermediating them, instead of conducting a database search on the basis of the query of the user received from a user terminal. In summary, the inventor of the present invention has come up with the following idea. The potential purposes and requests behind a query are prepared as "properties" which are knowledge-aggregated information, and the properties (hereinafter also referred to as query properties) are used instead of the query to make an inquiry to the database. Then, provided information outputted and presented to the user can reflect the request of the user even if the user cannot understand the content of the provided information. The present invention is results of earnest studies on the associations between queries and query properties, how to search for (or extract) and rate provided information on the basis of the query properties, and how to output, present, and determine the order of presenting queries, properties (query properties, provided information properties), and provided information.

The following describes the basic configuration of an information providing device according to an embodiment of the present invention, a basic information processing procedure performed by the information providing device, and the like, and then describes database structures, an information processing procedure, a provided information presentation method, and the like for providing a more sophisticated information providing service.

Embodiment

The information providing device according to the embodiment of the present invention is configured with a computer system which is connected to the Internet and has such functions as a search engine, a WWW server, and databases. The computer system has the same system configuration as an information providing device operated by a conventional search site or online-store. Note that an information providing device that makes an online-store accessible over the Internet by the WWW server function is described herein as an embodiment. The following also provides examples of the data management structures and operation of databases in the information providing device and a procedure of information search processing to return a web page (hereinafter referred to as a search result page) listing pieces of provided information on merchandise on the basis of a query received from a user terminal.

Network Configuration

FIG. 1 schematically shows a network configuration including the information providing device of the present embodiment. User terminals 10 and an information providing device 1 are connected to the Internet I. The information providing device 1 of the present embodiment has the following databases: a database (provided information database) 2 that performs information management such as storage, rating, extraction, update, and creation of information on various merchandise handled by the online-store; and a database (query database) 3 that manages various types of information used by information processing performed to identify provided information to rate or extract in the provided information database 2 on the basis of a query. The information providing device 1 of the present embodiment is characterized by how the query database 3 manages data and by the procedure of information processing performed to search for provided information using the data.
Databases
<Provided Information Database>

Figure 2:
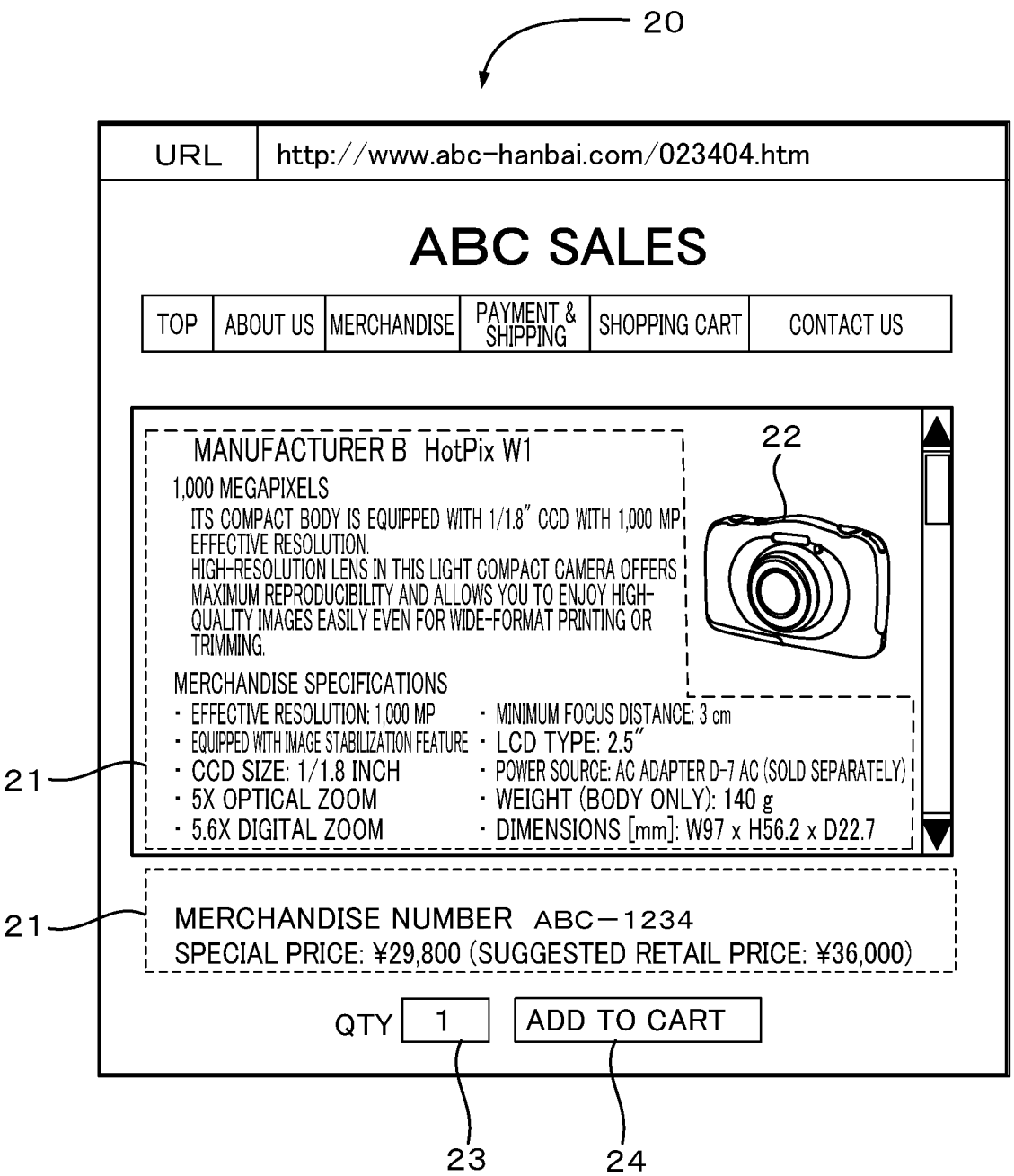
FIG. 2 is a diagram schematically illustrating a merchandise purchase page outputted from the information providing device to a user terminal.

An online-store made accessible by the information providing device with its WWW server function ultimately sends a user terminal a merchandise selling page through HTTP communications with the user terminal, the merchandise selling page including various pieces of information on merchandise sold by the online-store and a function to receive a merchandise purchase. FIG. 2 schematically illustrates a screen of a merchandise selling page 20. The merchandise selling page 20 includes a merchandise description (such as its manufacturer, model number, price, and features) 21, a merchandise image 22, a field 23 for entering the number of merchandise to purchase using a user terminal, a button 24 for receiving a purchase instruction, and the like. The provided information database in the information providing device stores HTML documents and image data used for generating the merchandise selling page 20. The provided information database also manages, as provided information, information such as descriptions of merchandise to be shown on the merchandise selling page 20. Further, the provided information database manages not only the descriptions of merchandise to be shown on the merchandise selling page, but also various pieces of information to be referred to in the process of information search processing on the basis of a query (such information is hereinafter referred to as merchandise properties), with the merchandise properties being associated with the provided information. Note that a merchandise property may be information contained in provided information to construct part of the provided information, or provided information and a merchandise property may be stored as separate data, and the provided information database may manage the associations between the provided information and the merchandise property.

Figure 3A:
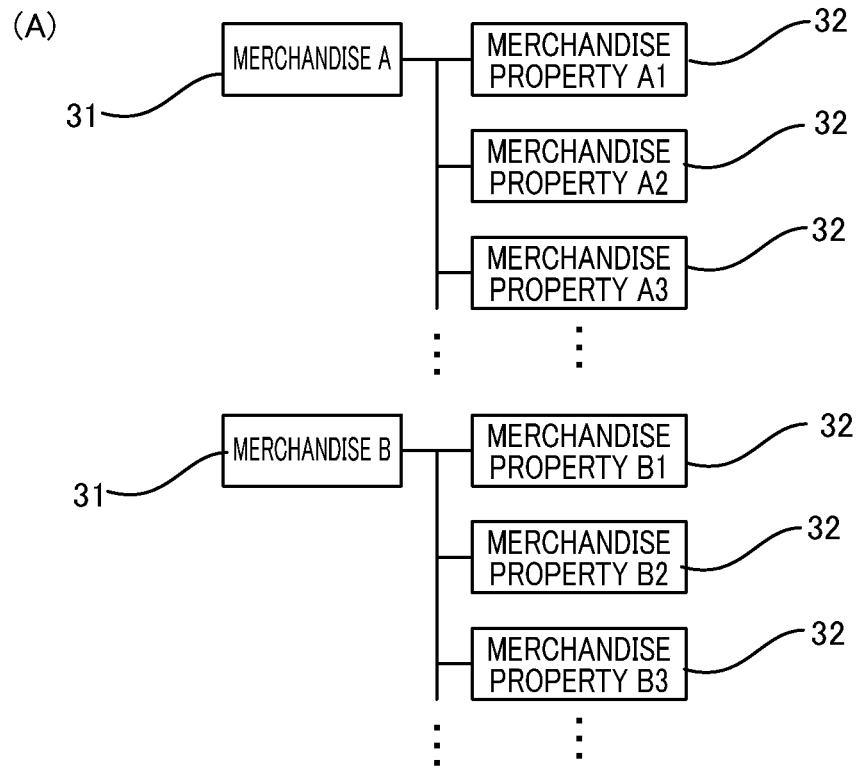
FIG. 3A is a diagram illustrating a schematic structure of a provided information database in the information providing device.
Figure 3B:
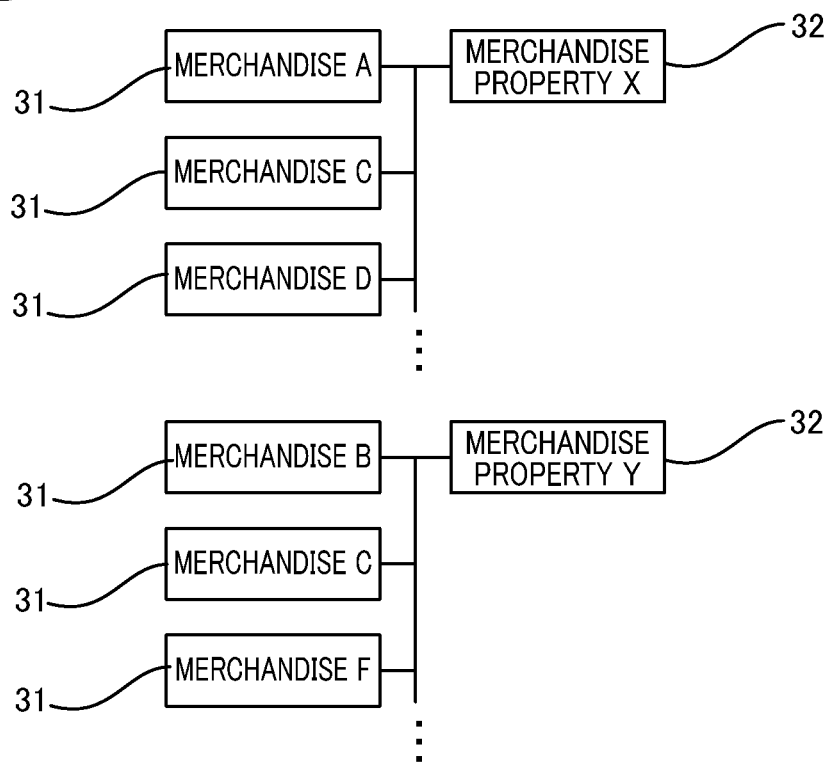
FIG. 3B is a diagram illustrating a schematic structure of the provided information database in the information providing device.

FIGS. 3A and 3B show the associations between provided information and merchandise properties. In FIGS. 3A and 3B, merchandise properties 32 are associated with provided information 31 which is details on a piece of merchandise identified with information such as an identification number or a model. The provided information 31 and the merchandise property 32 may be associated in such a manner that, as exemplified in FIG. 3A, one or more merchandise properties 32 are associated with each piece of provided information 31 on a piece of merchandise, or that, as exemplified in FIG. 3B, one or more pieces of provided information 31 on merchandise are associated with a particular merchandise property 32. In either case, the database manages associations between provided information and merchandise properties for apiece of particular merchandise. A merchandise property may of course be part of provided information. It goes without saying that when a merchandise property is part of provided information, the provided information database manages an association between the provided information and the merchandise property so as to be able to identify which part of the provided information is the merchandise property of the provided information.
<Query Database>

The provided information database manages provided information, which is ultimately outputted to a user terminal in response to a query inputted by the user terminal, and merchandise properties referred to by the search engine (the information providing device) when extracting the provided information. Meanwhile, the query database manages associations between various queries which may be inputted by user terminals and property information (hereinafter referred to as query properties). A query property is information reflecting a user request included in a query received from a user terminal, and there are one or more query properties for one query. The information providing device of the present embodiment makes an inquiry to the provided information database using not a query but a query property. In other words, a query property is information decidedly different from, for example, dictionary data on synonyms on a search keyword. Upon receipt of one of many keywords acceptable as a search query or a keyword obtained by synonymic deduction of the keyword from a user terminal, the information providing device identifies a query property of that keyword and uses the query property to rate or extract provided information in the provided information database.

The information providing device of the present embodiment ultimately outputs provided information to a user terminal in response to a query inputted from the user terminal. The following mainly describes details of information processing performed by the information providing device, taking a case where the information providing device extracts provided information to be ultimately outputted in response to a query inputted from a user terminal. Note that, as described earlier, in the information providing device of the present embodiment, reception of a query is a trigger for extraction or rating of provided information, but the received query itself is not used for an inquiry to the provided information database. A query is a character code corresponding to the text inputted by a user or form data sent to the network when a user specifies or chooses it through a front end, but is not data used directly for extraction of provided information. The nature of a query is information reflecting (or representing) a question, an inquiry, or a request of a user.

Figure 4A:
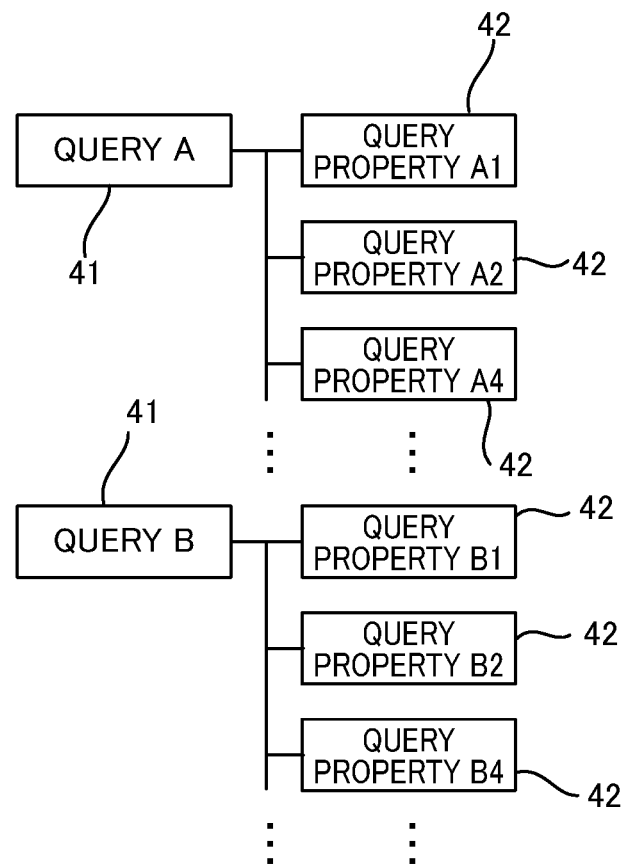
FIG. 4A is a diagram illustrating a schematic structure of a query databased in the information providing device.
Figure 4B:
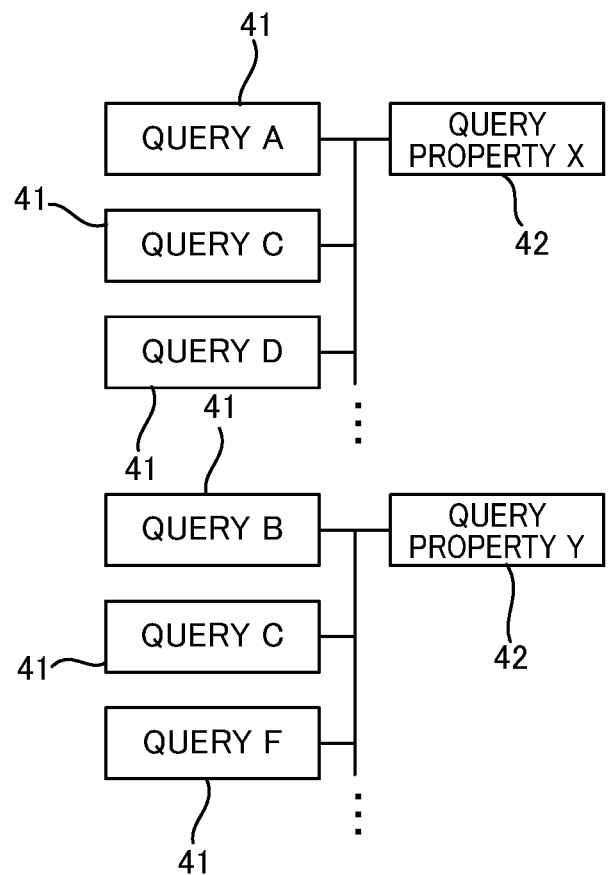
FIG. 4B is a diagram illustrating a schematic structure of the query database in the information providing device.
Figure 4C:
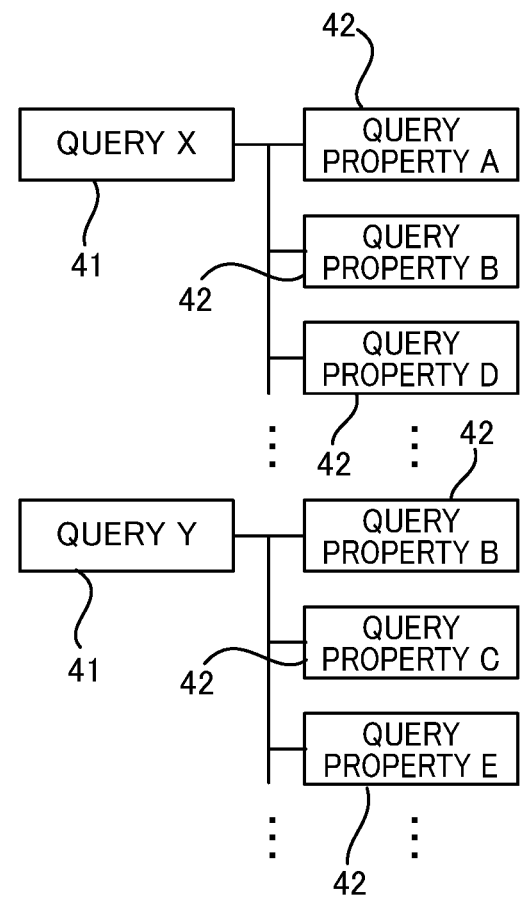
FIG. 4C is a diagram illustrating a schematic structure of the query database in the information providing device.
Figure 5:
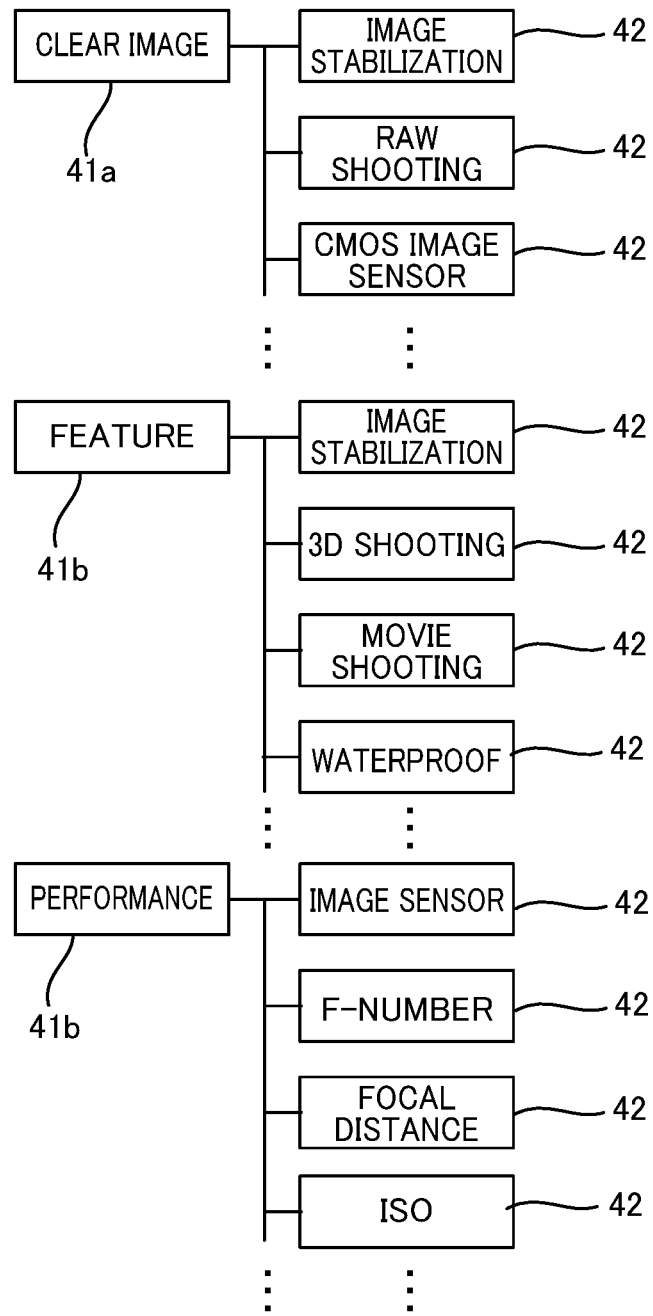
FIG. 5 is a diagram illustrating specific examples of relations between queries and query properties managed by the query database.
Figure 6A:
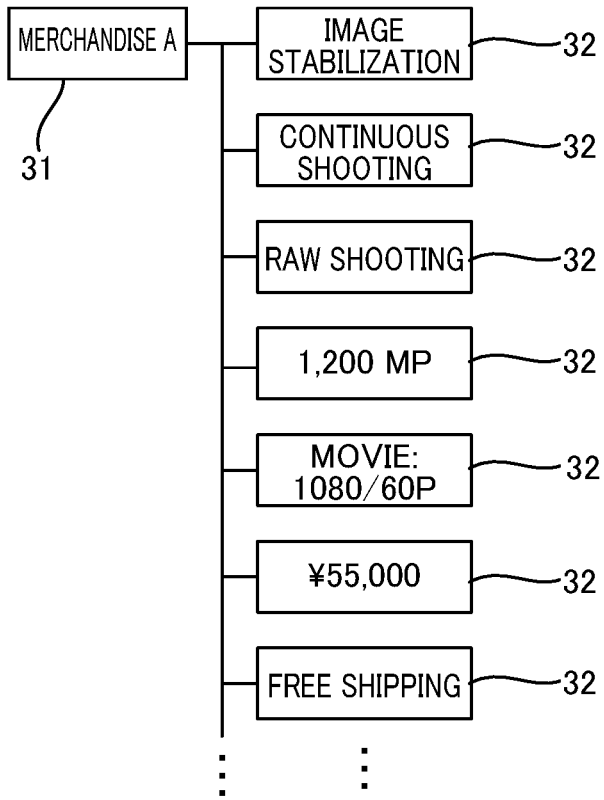
FIG. 6A is a diagram illustrating a specific example of a relation between provided information and provided information properties managed by the provided information database.

FIGS. 4A and 4B illustrate associations between queries and query properties. One or more query properties 42 may be associated with each query 41 sent from a user terminal as illustrated in FIG. 4A, or one or more queries 41 may be associated with a particular query property 42 as illustrated in FIG. 4B. Of course, as illustrated in FIG. 4C, the same query property (a query property B in FIG. 4C) may be associated with different queries 41. Note that the query database may manage part of a query as a query property, or manage a query and a query property as separate data. Either case may be employed as long as the association between a query and a query property is managed in such a manner that the query property can be identified on the basis of the query. Of course, the provided information database and the query database may be integrated on the basis of the associations among queries, properties, and provided information. Also in this case, a property of a query can be handled as a query property, and a property of provided information can be handled as a merchandise property.
Information Search Processing A description is given below of provided information search processing by the information providing device, taking an example where a user purchases a digital camera at an online-store using their user terminal. FIG. 5 is a diagram illustrating an example of the data management structure of the query database in this example. Further, FIGS. 6A and 6B illustrate an example of the data management structure of the provided information database.

In the query database exemplified in FIG. 5, query properties 42 such as "image stabilization," "RAW shooting," and "CMOS image sensor" are associated with a query 41a "clear image," which is a possible keyword inputted about a digital camera. In this example, besides the keyword, forms are embedded in a webpage at positions having character strings such as "feature" and "performance," to send the character strings to the information providing device as queries 41b. Note that for each of natural-text keywords such as "clear image" that may be received as the query 41a, query properties may be associated with text of that keyword beforehand, or well-known morphological analysis may be used to convert a query inputted in natural text into a keyword for identifying query properties from the query. For instance, a unspecific term "clear" is received as a query "high image quality," and predetermined query properties (such as, e.g., "image stabilization," "image sensor," and "the number of pixels") are associated with the query "high image quality" beforehand. Of course, "clear image" may also be placed on the webpage as a query 41b like "feature" and "performance" described above.

Note that in the provided information database, various merchandise properties are associated with each piece of provided information on a piece of certain merchandise. FIGS. 6A and 6B illustrate the associations between provided information on apiece of merchandise and merchandise properties. As illustrated in FIG. 6A, various merchandise properties, including "image stabilization," "movie: 1080/60P," and "¥55,000," are associated with a piece of certain merchandise A. Then, the providing information database manages the properties such as "image stabilization," "movie: 1080/60P," and "¥55,000" associated with the piece of merchandise A so that the following are recognizable: the piece of merchandise A has features such as "image stabilization" and "movie shooting," with "movie shooting" further having the performance of "1080/60P" (resolution and frame rate) added thereto as properties, and the price is "¥55,000."

Figure 6B:
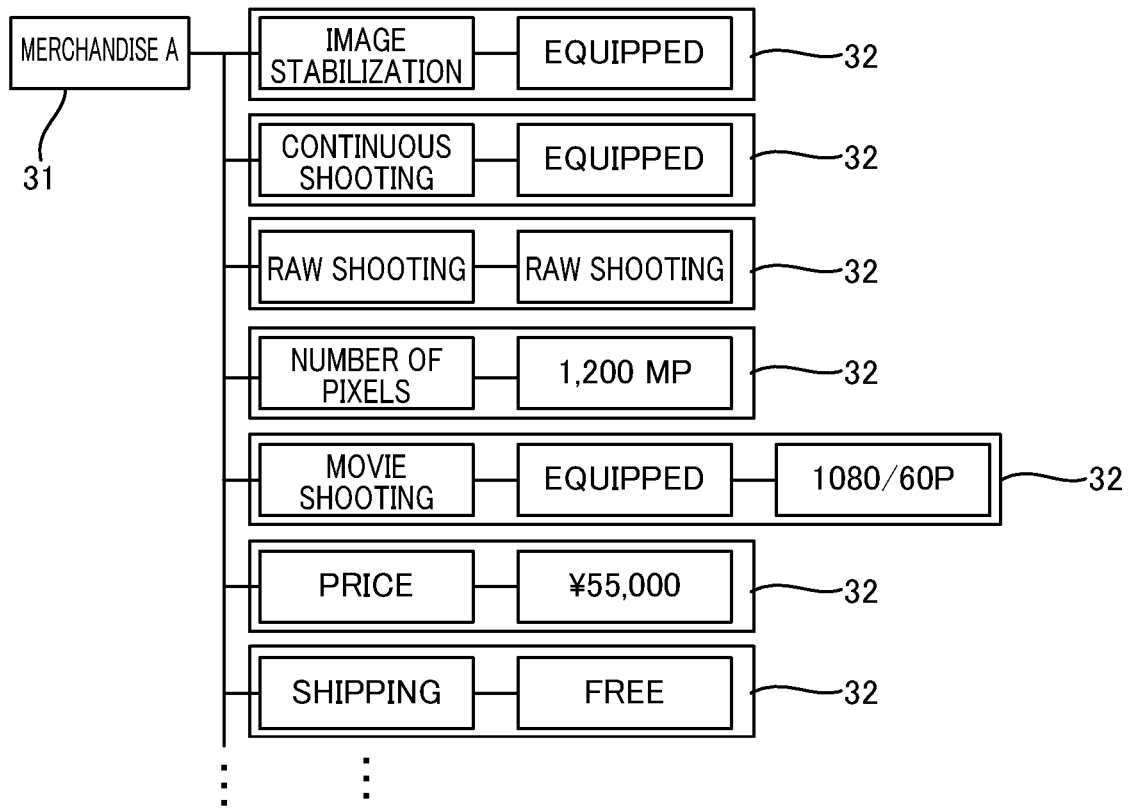
FIG. 6B is a diagram illustrating a specific example of a relation between provided information and provided information properties managed by the provided information database.

Of course, as illustrated in FIG. 6B, each merchandise property may be associated with information on whether the piece of merchandise is equipped with the merchandise property and detailed information on the merchandise property. For example, every piece of merchandise is associated with types of properties related to features such as "image stabilization" and "continuous shooting," and if the piece of merchandise shown in FIGS. 6A and 6B has any of the features, information or a code indicative of being "equipped" with that feature is added as a property. For features such as "movie," in addition to information indicative of whether the piece of merchandise is equipped with the feature, its performance "1080/60P" is added as a property. If the price is ¥55,000, a property "¥55,000" is added to the property type "price."

Next, the following describes a procedure from a user's access from their user terminal to an online-store made accessible over the Internet by the information providing device to display of provided information about apiece of target merchandise on the user terminal, and through that procedure, describes how the information providing device performs information search processing. Although the online-store handles not only digital cameras but also merchandise of all kinds of categories, it is assumed here that a webpage (merchandise search page) for searching merchandise belonging to the category of digital cameras at the online-store is already being displayed on the user terminal by HTTP communications between the user terminal and the information providing device, i.e., data communications through a webpage, and then, the user terminal and the information providing device perform further HTTP communications on the basis of the merchandise search page, and ultimately, the merchandise selling page illustrated earlier in FIG. 2 is displayed.

Figure 7:
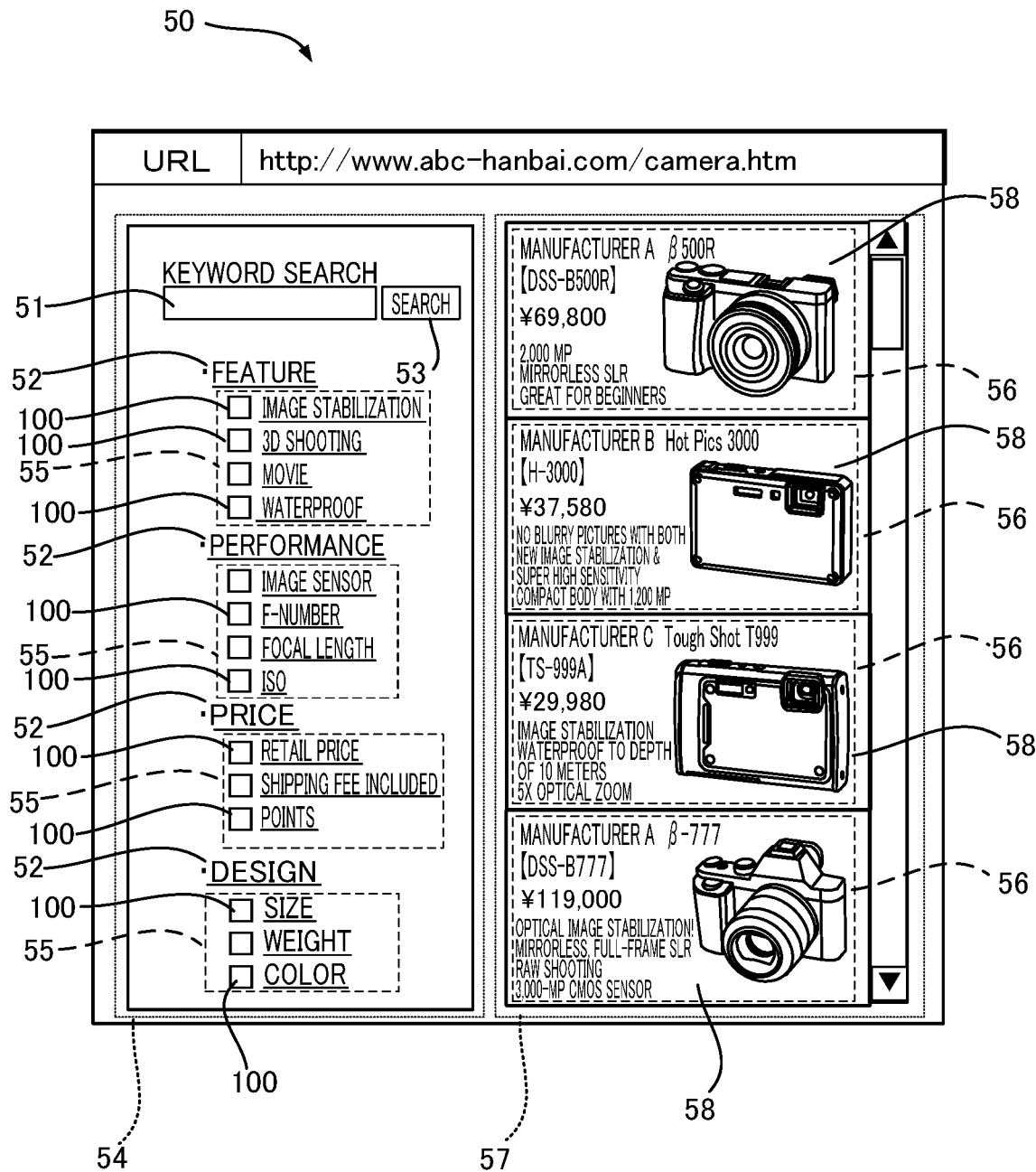
FIG. 7 is a diagram schematically illustrating a merchandise search page outputted from the information providing device to a user terminal.

FIG. 7 schematically illustrates a merchandise search page 50 for digital cameras. As illustrated in FIG. 7, the merchandise search page 50 includes: a query input field 54 including a text box 51 for entering a query as natural text or a keyword, character strings 52 set to allow a user to choose any of queries prepared in advance and send a query chosen by the user terminal to the information providing device every time the user choses a query, a button 53 for sending a text query, and the like; and a list 57 of pieces of provided information 56 each including information such as the image of a digital camera handled by the online-store and its merchandise description. In this example, each query selectable when the user chooses a character string 52 in the query input field 54 is shown together with query properties 55 associated with the character string. This function is to make the user understand as much as possible the knowledge of experts linked to each specifiable query. It is certainly possible that the user cannot understand the query properties themselves at first, but the user may naturally come to understand them as the user makes more and more information searches. Of course, the merchandise search page 50 may be such that query properties are not shown together with specifiable queries.

In the example illustrated in FIG. 7, the character strings of the query properties 55 are also underlined to indicate that they are linked, so that a character string chosen by the query property 55 is selectable as another query. For example, "image stabilization" is one of the query properties of a query "feature," and the query database has "image stabilization" as a query, and this "image stabilization" as a query may be associated with query properties. Specifically, if a character string "image stabilization" is entered in the text box 51, the query "image stabilization" has query properties associated therewith. Possible query properties that are associated with a query "image stabilization" may be "digital" and "optical" as image stabilization methods. Further, webpage screens in FIG. 7 and so forth has checkboxes 100 next to the respective query property character strings, and the function and usage of these checkboxes 100 will be described later.

The provided information list 57 on the merchandise search page 50 presents fields 58 for displaying the respective pieces of the provided information 56 in a predetermined order. The display fields 58 may be sorted by, for example, sales record, the number of times the merchandise purchase page for the digital camera has been accessed, manufacturer, name, and price, and the display fields 58 may be sorted by any rule appropriately set. The information providing device of the present embodiment is characterized by its information processing to rate or extract the provided information 56 on a piece of merchandise meeting a potential request of the user in a query entered on the merchandise search page 50 using a user terminal, and display the provided information 56 as the list 57. Note that the means and method for entering a query are not limited to the text box 51 for entering a query as a keyword, the character string 52 or the checkbox 100 set to send a query to the information providing device, and the like. Any input means and method, such as voice, may be used as long as the information providing device can receive the input as a query.

Figure 8:
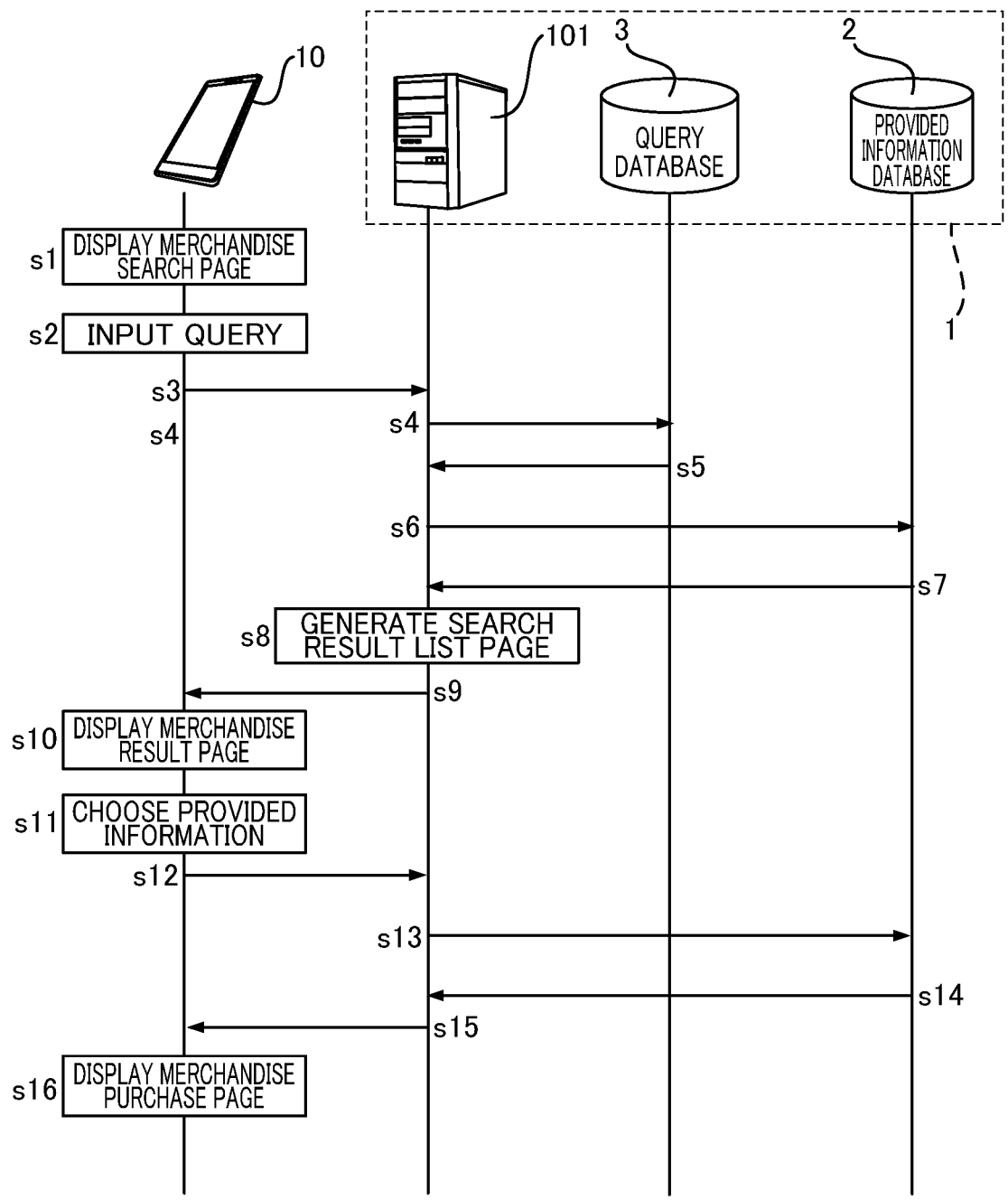
FIG. 8 is a diagram illustrating the procedure of information search processing by the information providing device.

FIG. 8 schematically illustrates a procedure of communications between the user terminal 10 and the information providing device 1. To facilitate understanding of the procedure of information processing and the input and output directions of various pieces of data, a control unit 101 is shown as hardware and software configurations of the information providing device 1 such as a front end, a WWW server, and a search engine, to implement processing for data communications with the user terminal 10, processing to generate a webpage to be outputted to the user terminal 10, and processing to make an inquiry to the databases (2, 3) in the information providing device 1 using appropriate data and acquire results of the inquiry.

Then, in the configuration illustrated in FIG. 8, a user receives a merchandise search page from the information providing device 1 using the user terminal 10 (s1), and inputs a query in the text box on the merchandise search page (s2). Here, assume that the user inputs natural text "clear image" as the query. Then, the user terminal 10 sends the query to the information providing device 1 (s3). Upon receipt of the query "clear image" from the user terminal 10, the control unit 101 of the information providing device 1 makes an inquiry to the query database 3 using the query (s4), and the query database 3 identifies query properties corresponding to the query in the inquiry and outputs the query properties to the control unit 101 (s5). As illustrated earlier in FIG. 5, properties such as "image stabilization," "RAW shooting," and "CMOS image sensor" are associated with the query "clear image," and therefore the query database 3 outputs these query properties. Then, the control unit 101 makes an inquiry to the provided information database 2 using these query properties (s6).

As described earlier, each piece of provided information in the provided information database 2 is associated with a merchandise property. For example, in the above example illustrated in FIGS. 6A and 6B, properties "image stabilization," "continuous shooting," and "RAW shooting" are associated with the provided information on the piece of merchandise A as its merchandise properties. In this case, the provided information database 2 extracts pieces of provided information associated with a merchandise property that matches any of the query properties received from the control unit 101, and returns the extracted pieces of provided information to the control unit 101 (s7). The control unit 101 generates a search result page including a list of the pieces of provided information received from the provided information database 2 (s8), and sends the search result page to the user terminal 10 (s9). The user terminal 10 displays the search result page received (s10). Then, if a user finds, in the provided information list displayed, provided information on a piece of merchandise that they want to purchase or that they may want to purchase, the user may make an instruction to specify the provided information using the user terminal 10 (s11). In response to this instruction, the control unit 101 asks the provided information database 2 to transfer a merchandise selling page for the provided information (s13, s14), and sends the merchandise selling page to the user terminal (s15). As a result, the merchandise selling page 20 illustrated earlier in FIG. 2 is displayed on the user terminal 10 (s16).

Figure 9:
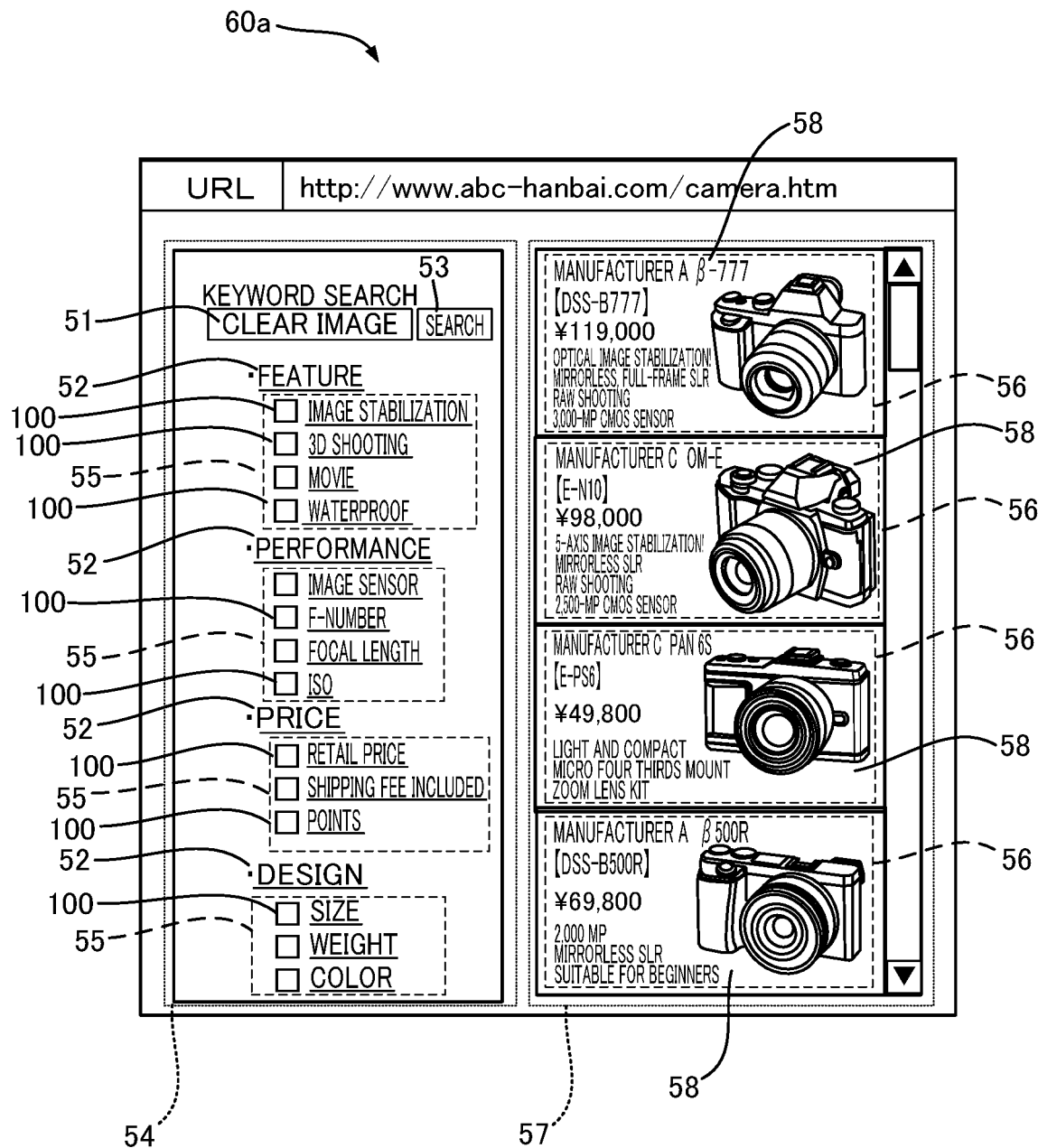
FIG. 9 is a diagram schematically illustrating a search result page outputted from the information providing device to a user terminal.

FIG. 9 illustrates an example search result page 60a listing pieces of provided information extracted on the basis of a query. This example has almost the same format as the merchandise search page 50 illustrated in FIG. 7, and includes the query input field 54 for additional input of a query and the list 57 of the provided information 56. The difference is that the list 57 of the provided information 56 includes only the provided information 56 extracted by the information providing device 1 in response to a query. Then, if a user looks through the pieces of provided information 56 on the search result page 60a and finds the provided information 56 on apiece of merchandise that they want, the user chooses the field 58 displaying that provided information 56.

Then, through a hyperlink set in the display field 58, the merchandise selling page 20, like the one illustrated in FIG. 2, is displayed on the user terminal 10 to carry out a procedure for purchasing the piece of merchandise. The user then reads the details of the provided information on the piece of merchandise shown on the merchandise selling page 20, and if they like the piece of merchandise, may proceed to carry on the rest of the merchandise purchasing procedure.

As described, the information providing device of the present embodiment does not present the user with provided information that contains a query "clear image" or "high image quality," but instead, rates provided information on the basis of query properties associated with the query and identifies provided information to be extracted on the basis of the rating results. Then, in the example illustrated here, provided information to be extracted is identified on the basis of a comparison between a merchandise property and a query property which is associated with a query to rate the provided information as to a method of provision. In this way, in the information providing device of the present embodiment, a fuzzy user request included in a query is reflected in provided information presented. Thus, even if a user does not have full knowledge about the provided information, the user can obtain provided information meeting their potential request.

<Provided Information Extraction Algorithms>

Figure 10A:
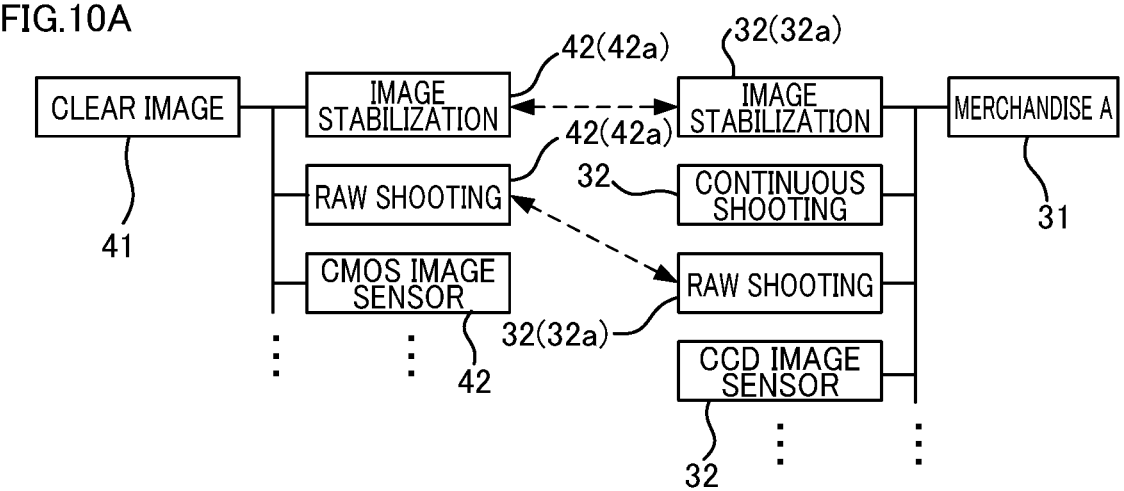
FIG. 10A is a diagram illustrating an example of a provided information extraction algorithm used in the information search processing by the information providing device.
Figure 10B:
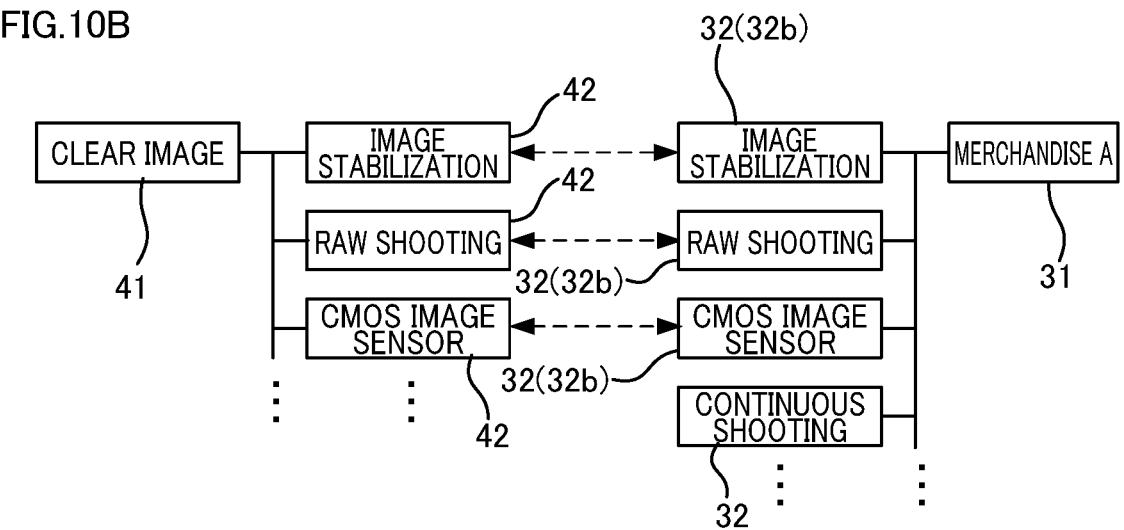
FIG. 10B is a diagram illustrating an example of a provided information extraction algorithm used in the information search processing by the information providing device.
Figure 10C:
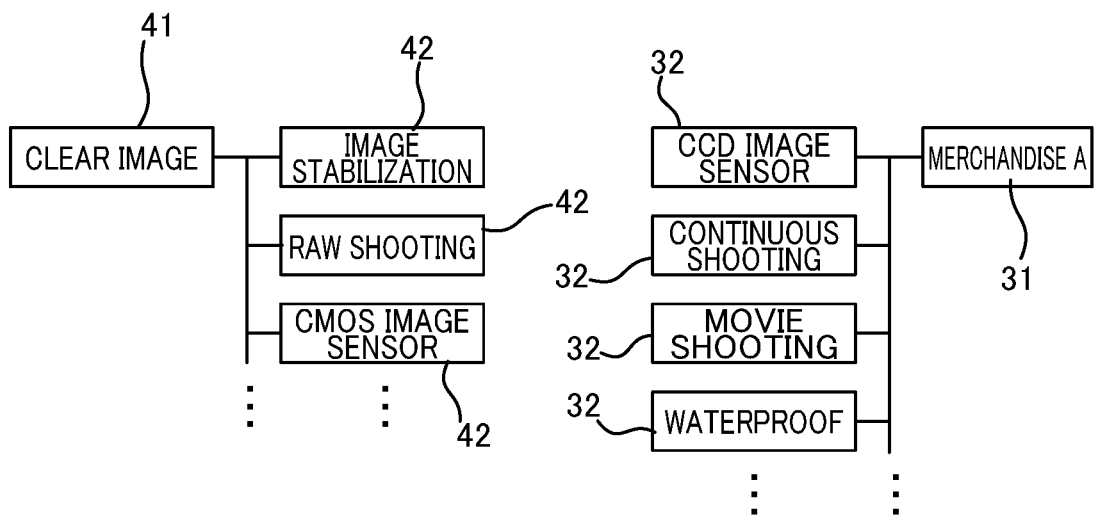
FIG. 10C is a diagram illustrating an example of a provided information extraction algorithm used in the information search processing by the information providing device.

In the above embodiment, provided information including a merchandise property that matches a query property corresponding to a query is extracted and presented. The standard for the extraction, i.e., rules for identifying provided information to be extracted on the basis of a query property (provided information extraction algorithm) can be set appropriately. FIGS. 10A, 10B, and 10C exemplify provided information extraction algorithms. One provided information extraction algorithm exemplified in FIG. 10A may identify the provided information 31 associated with merchandise properties 32a that match some 42a of the query properties 42 corresponding to a query 41 received. In this case, the provided information 31 associated with the merchandise properties 32 at least one of which matches any of the query properties 42 may be identified to be extracted, or the provided information 31 associated with the merchandise properties 32 that match a predetermined number or more (e.g., half or more than half) of a plurality of query properties 42 may be identified. Further, as illustrated in FIG. 10B, only the provided information 31 associated with merchandise properties 32b that match all of the query properties 42 may be extracted. Of course, as illustrated in FIG. 10C, an algorithm may be employed which removes, from extraction targets, the provided information 31 associated with merchandise properties 32 none of which matches the query properties 42. In other words, the algorithm may identify the provided information 31 that is not to be extracted.

Note that, when the standard for extracting provided information illustrated in FIG. 10A is employed to extract provided information associated with merchandise properties 32 that match one or some of the query properties 42, a large number of pieces of provided information may be extracted. Also, when an abstract query 52 such as "feature," "performance," "price," and "design" with a plurality of query properties 55 illustrated in FIG. 9 is selected, most or all of the pieces of provided information 56 may be extracted without the merchandise being refined. Thus, in information processing performed in response to input of a query, the information providing device may perform processing to rate provided information so as to make sure to extract provided information associated with merchandise properties that match as many query properties as possible or to present such provided information at the top of the list. In other words, the information providing device does not extract provided information to be outputted, but set the priority order of all pieces of provided information on the basis of rating results. Thereby, a potential request of a user inputting a query or provided information beneficial to the user can be presented at the top of the list. Of course, a predetermined number of pieces of provided information can be extracted on the basis of the rating results.

Figure 11:
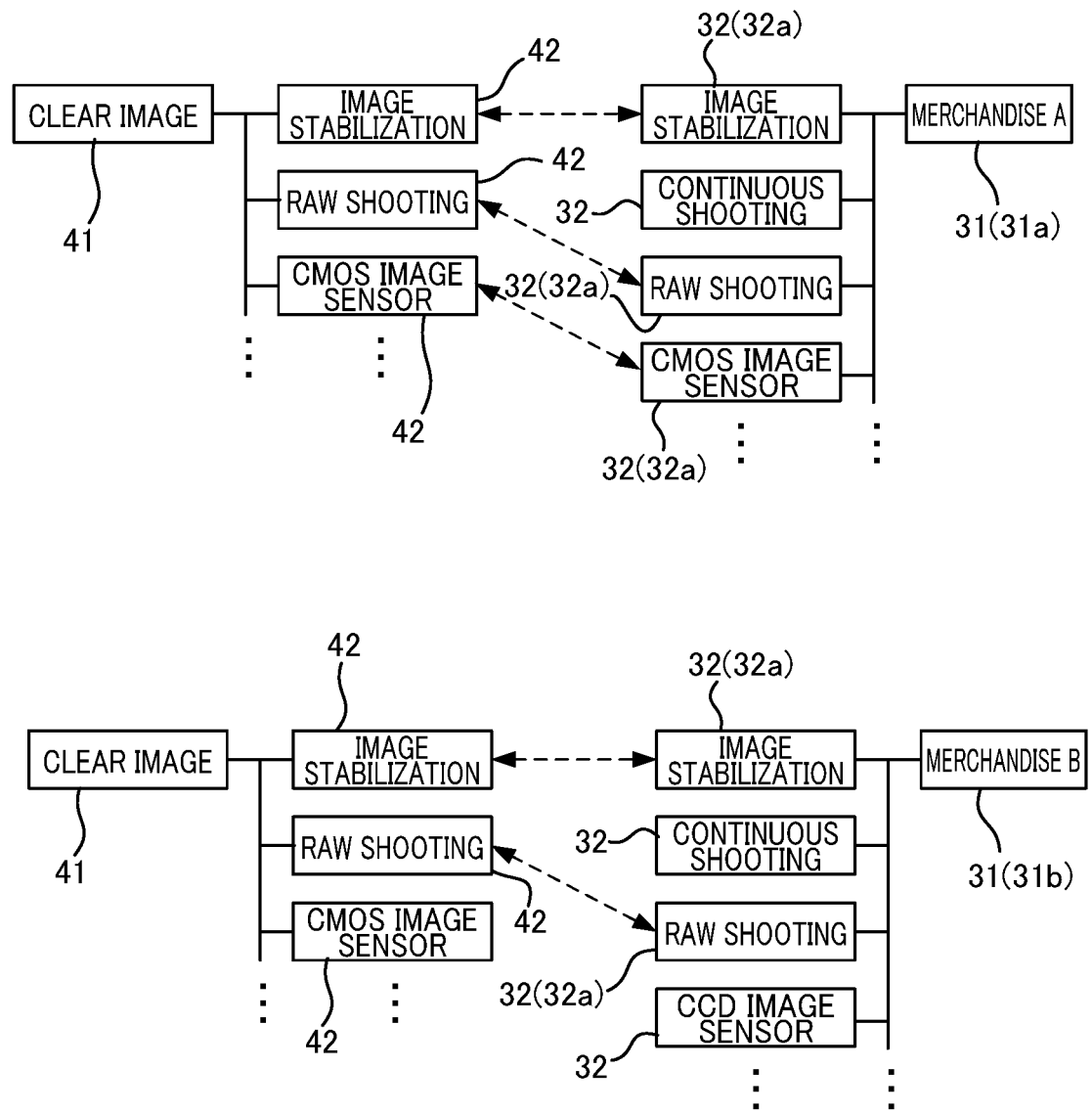
FIG. 11 is a diagram illustrating an example of an algorithm used in the information search processing by the information providing device to determine the priority level of provided information extracted.

FIG. 11 schematically illustrates information processing to set the priority order of pieces of provided information (31a, 31b). In the example illustrated in FIG. 11, provided information (31a) on a piece of merchandise A and provided information on a piece of merchandise B (31b) are both associated with merchandise properties 32a that match some query properties 42. However, the provided information (31a) on the piece of merchandise A and the provided information on the piece of merchandise B (31b) are different in the number of matches, and the provided information 31a on the piece of merchandise A has more merchandise properties 32a matching the query properties 42a when the merchandise properties 32 associated with the provided information 31a on the piece of merchandise A are compared with the merchandise properties 32 associated with the provided information 31b on the piece of merchandise B. Thus, in the example illustrated in FIG. 11, the provided information 31a on the piece of merchandise A is higher in priority rank than the provided information 31b on the piece of merchandise B, and when the provided information (31a) on the piece of merchandise A and the provided information (31b) on the piece of merchandise B are both extracted on the basis of the query 41, the provided information on the piece of merchandise A is presented higher in the provided information list on the search result page in FIG. 9 than the provided information on the piece of merchandise B. Of course, if there is an upper limit in the number of pieces of provided information to be shown in the list, only the provided information 31a on the piece of merchandise A may be extracted, and the provided information 31b on the piece of merchandise B may not be shown in the list on the search result page.

Figure 12:
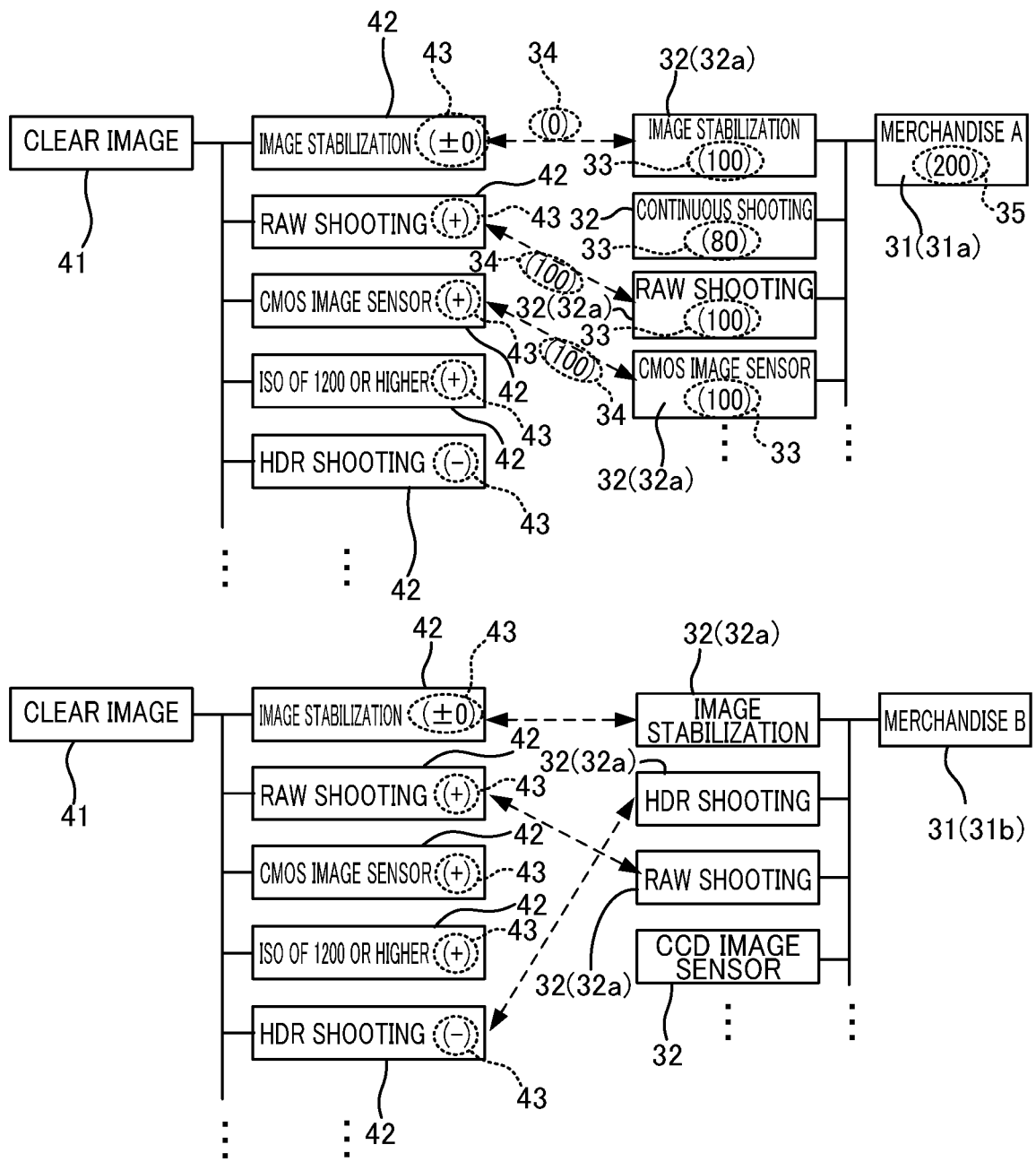
FIG. 12 is a diagram illustrating another example of an algorithm used in the information search processing by the information providing device to determine the priority level of provided information extracted.

There is also a case where a plurality of pieces of provided information has merchandise properties that are equally associated with the same query properties. In such a case, the plurality of pieces of provided information all have the same priority rank. Of course, if merchandise properties of many pieces of provided information are equally associated with the same query properties, the many pieces of provided information end up being targeted for extraction. To deal with such a situation, a query property may be associated with information used to rate provided information to determine its rank of priority for extraction or presentation (such information will be hereinafter referred to as rating information). Note that the rating information may be a numeral value or an ordinal number indicative of superiority and inferiority. Note that the rating information can also be used as information for controlling, for example, the order of presenting pieces of provided information in the list. FIG. 12 schematically illustrates how provided information 31 is extracted on the basis of rating information 43 in each query property 42. The query 41 "clear image" is associated with a plurality of query properties 42, and the provided information (31a) on the piece of merchandise A and the provided information (31b) on the piece of merchandise B have the same number of matching combinations of the query properties 42 and the merchandise properties 32a. However, each query property 42 has "+," "±," or "−" added thereto as the rating information 43, and the sum of the pieces of rating information 43 in the query properties 42 matching with the merchandise properties 32 is larger for the provided information (31a) on the piece of merchandise A than for the provided information (31b) on the piece of merchandise B, thus making the provided information 31a on the piece of merchandise A higher in priority rank.

In addition to the rating information 43 associated with each query property 42, rating information 33 may also be associated with each merchandise property 32 constructing the provided information 31, as added to each merchandise property 32 constructing the provided information 31a on the piece of merchandise A in FIG. 12. Then, on the basis of the rating information (43) and the rating information (33) for the query property 42 and the merchandise property 32 matching each other, a rating value 34 of a merchandise property 32 is generated for each matching combination of the merchandise property 32 and the query property 42. Then, a rating value 35 of the provided information 31 for the query 41 may be generated.

For example, assume that "100" is associated as the rating information 33 with each of the merchandise properties 32a "image stabilization," "RAW shooting," and "CMOS image sensor," which are matches between the merchandise properties 32 constructing the provided information 31a on the piece of merchandise A and the query properties 42 constructing the query 41 "clear image." The rating information 43 on the query property 42 "image stabilization" of the query 41 "clear image" is "±." Thus, although the rating information 33 of "100" is associated with the merchandise property 32a "image stabilization," a rating value 34 "0" is generated for the association between the merchandise property 32a "image stabilization" and the query property 42 "image stabilization." Since the rating information 43 on the query property 42 "RAW shooting" is "+," a rating value 34 "100" is generated for "RAW shooting." Similarly, since the rating information 43 on the query property 42 "CMOS image sensor" is "+," a rating value 34 "100" is generated for the corresponding merchandise property 32a "CMOS image sensor." Then, the rating values 34 for the merchandise properties 32a generated for the respective associations between the query properties 42 and the merchandise properties 32a add up to "200" as the rating value 35 for the provided information 31a on the piece of merchandise A for the query 41 "clear image." Note that the rating information 43 is not limited to "+," "±0," and "−." Any rating information 43 may be set, such as a weight on a query property to obtain for example a query "clear image," or a formula, ratio, or percentage referring to an property used for rating or the content (e.g., a value) of the property.

Database Structures

The above embodiment describes the basic concepts of the structures of the databases in the information providing device, data management structures of the databases, and the information processing procedure. The database structures, the data management structures, and the information search processing of the information providing device may be appropriately modified as long as they conform to the basic concepts described above. For example, in the query database or the provided information database, property information may be associated with a query or provided information in a layered manner.

Figure 13:
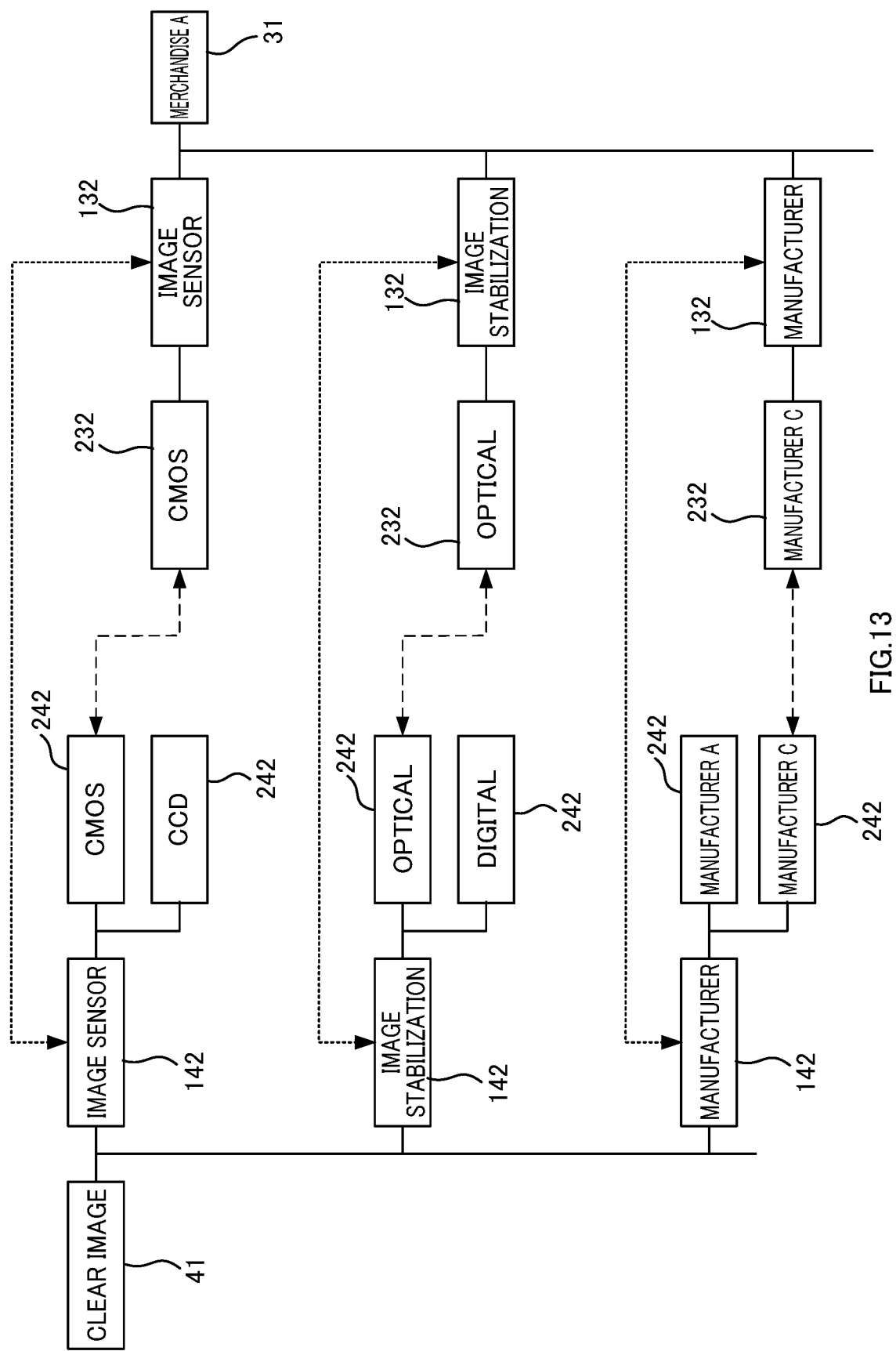
FIG. 13 is a diagram illustrating other structures of the provided information database and the query database.

FIG. 13 illustrates an example of how the query database and the provided information database manage data when they have layered structures. For example, in the query database, query properties 142 such as "image sensor," "image stabilization," and "manufacturer" are associated with the query 41 "clear image" as its constituents, with each of the constituents being further associated with constituents. For instance, the query "image stabilization" closer to the query (hereinafter referred to as an upper-layer query property 142) is associated with constituents such as "optical" and "digital" as lower-layer query properties (hereinafter referred to as lower-layer query properties 242"). Like the query database, the provided information database may also employ a layered structure for management of merchandise properties (132, 232) of the provided information 31. For instance, the provided information 31 on the piece of merchandise A is associated with merchandise properties "image sensor," "image stabilization," and "manufacturer" (hereinafter referred to as upper-layer merchandise properties) 132, and each of the upper-layer merchandise properties 132 is associated with a merchandise properties of a lower layer (hereinafter referred to as a lower-layer merchandise property) 232. For instance, the upper-layer merchandise property 132 "image sensor" is associated with a lower-layer merchandise property 232 "CMOS." Upon receipt of a query, the information providing device identifies, in the query database, upper-layer query properties constructing the query and lower-layer query properties corresponding to each of the upper-layer query properties, and compares the structure of the query properties with the provided information from the upper layer or the lower layer. In other words, the information providing device rates the query properties and the merchandise properties on the basis of their structures. Then, the information providing device may extract the provided information 31 having a combination of upper-layer and lower-layer merchandise properties matching with a combination of upper-layer and lower-layer query properties. Alternatively, even if the lower-layer 232 is unknown and does not match, the information providing device may extract the provided information 31 having an upper-layer query property 142 matching with an upper-layer merchandise property 132. Moreover, even if the provided information 31 does not have a layered structure and there is no upper-layer merchandise property 132 "image sensor," the information providing device may extract provided information having the merchandise property 232 "CMOS" matching with the lower-layer query property 242 of the upper-layer query property 142 "image sensor." Further, properties in each layer (upper layer and lower layer) may have rating information added thereto. The rating information may be added to one of the upper layer and the lower layer, or the rating information may be added to both layers and added together, or each layer may be weighted to perform rating on the basis of the weights. When the query properties are structured by layers, drilled-down rating of provided information can be achieved.

Figure 14:
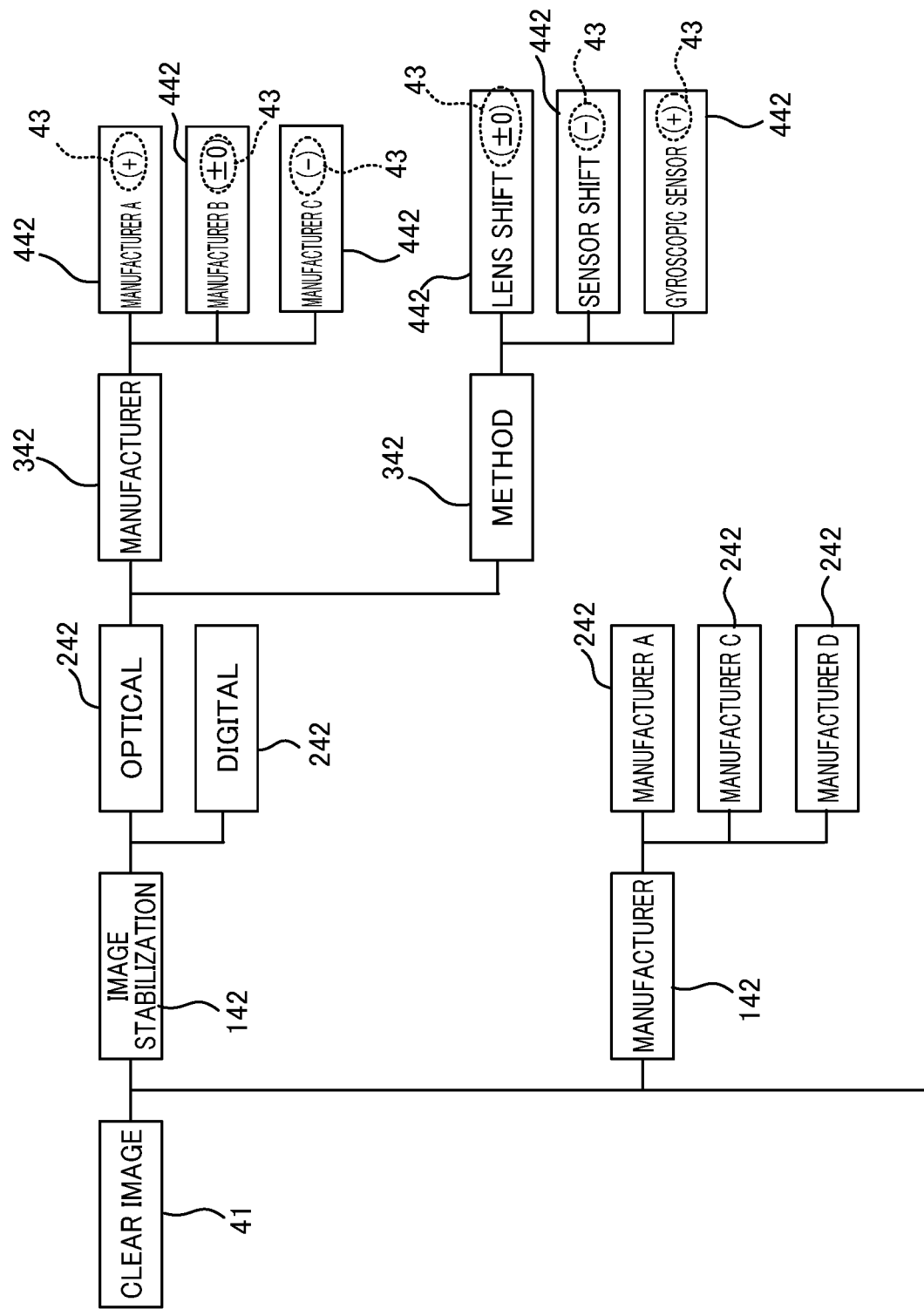
FIG. 14 is a diagram illustrating an example of a layered structure of the query database.

Although the query properties are structured by two layers in the example illustrated in FIG. 13, the number of layers in the layered structure is not limited to two. FIG. 14 illustrates an example query database in which query properties structured by four layers. Some of the query properties have rating information attached thereto. In FIG. 14, all the query properties constructing a query are grouped into constituents of a first layer, constituents of a second layer, constituents of a third layer, and so on as they are located closer to the lower layer. The query property "manufacturer" is in the first layer and also in the third layer which is the lower layer of the query property "optical" traced from "image stabilization" from the upper layer to the lower layer.

On one hand, the query property 142 "manufacturer" in the first layer includes, for example, "Manufacturer A" and "Manufacturer D" which are, for example, an optical equipment manufacturer, a film camera manufacturer, and the like. On the other hand, the query property in the fourth layer includes such constituents as a manufacturer that employs optical image stabilization technology for its digital cameras or a manufacturer with an established reputation about its optical image stabilization technology. For example, these constituents are likely to include an electronics manufacturer having more sophisticated sensor technology than a film camera manufacturer, and are, for example, "Manufacturer A" and "Manufacturer B."

Tracing the query properties of the query "clear image" from the upper layer to the lower layer forms a combination of, for example, "image Stabilization," "optical," "manufacturer," and "Manufacturer A." This combination is, so to speak, one structure for the query property "image stabilization" in the first layer constructing the query, and for example, when this structure is compared with provided information, a digital camera employing the optical image stabilization of Manufacturer A can be presented as a search result. While "Manufacturer D" 242 is associated with the first-layer query property "manufacturer" 142, "Manufacturer D" is not associated with "manufacturer" 342 in the third layer. In such a case, for the query "clear image," provided information having "Manufacturer D" as "manufacturer" is targeted for extraction or rating, but provided information having "Manufacturer D" as "manufacturer" for "optical" "image stabilization" is not targeted for extraction or rating. Conversely, while "Manufacturer B" 242 is not associated with the first-layer query property "manufacturer" 142, "Manufacturer B" is associated with "manufacturer" 342 in the third layer. In such a case, for the query "clear image," provided information having "Manufacturer B" as "manufacturer" is not targeted for extraction or rating, but provided information having "Manufacturer B" as "manufacturer" for "optical" "image stabilization" is targeted for extraction or rating. In this way, query properties (hereinafter referred to as lower-layer query properties) 242 may be associated with each query property (hereinafter referred to as an upper-layer query property) 142, and the query properties (142, 242) may be associated with the query 41 and managed in a layered manner. The query database thus manages query properties from multiple aspects in a unified manner.

Note that the first-layer query property "manufacturer" and the third-layer query property "manufacturer" may be compared with the property "manufacturer" of provided information and rated, or if an property of the provided information is managed as "manufacturer" of "image stabilization," may be compared with that property and rated. Further, the information source of provided information to be compared and rated on the basis of query properties (address information such as an URL) may be specifiable for each query property. For instance, assume that information up to "optical" 232 of "image stabilization" 132 of "piece of merchandise A" 31 in FIG. 13 is available from the information source offered by the manufacturer of the piece of merchandise A, while information (442) on "manufacturer" 342 of "optical" 242 of the "image stabilization" 142 illustrated in FIG. 14 is not available. In such a case, a different information source may be specified (such as, for example, a site by a manufacturer providing optical image stabilization or a knowledgeable person). Specifically, information about an information source may be associated with the third-layer query property "manufacturer" 342. Then, when provided information is compared and rated for extraction on the basis of a query property, an inquiry may be made to the information source specified in the query property using information related to the provided information 31 (e.g., the piece of merchandise A).

Note that, as illustrated in FIGS. 10A, 10B, and 10C earlier, the standard for extracting the provided information on the piece of merchandise A is set separately. Specifically, provided information on a piece of merchandise A may be extracted when the piece of merchandise A has a combination of upper- and lower-layer merchandise properties that matches a combination of upper- and lower-layer query properties or when there are a predetermined number or more of matches between a combination of upper- and lower-layer merchandise properties and a combination of upper- and lower-layer query properties. Alternatively, provided information may be extracted when all the combinations of upper- and lower-layer merchandise properties match combinations of upper- and lower-layer query merchandise properties. In other words, it is possible to make an appropriate setting as to which of the layers in the query property structure traced from the upper layer to the lower layer the information providing device uses as the standard for provided information extraction.

Also when the query properties are managed in layered structure as described above, rating information may be associated with each constituent of a query property. For instance, for the query "clear image" in the example illustrated in FIG. 13, if the query property 242 "optical" in the lower layer of the query property 142 "image stabilization" is superior to the query property 242 "digital" of "image stabilization," higher rating information is added to the query property 242 "optical" than to the query property 242 "digital."

In the query database illustrated in FIG. 14 having a multi-layered structure of three or more layers, no rating information is added to the second-layer query properties 242 indicating the methods of "image stabilization," and rating information is associated with each of the query properties 442 for the respective manufacturers constructing the query property 342 "manufacturer," which is in the lower layer of the query property 242 indicative of a method. Then, for example, if a given manufacturer (e.g., Manufacturer A) has an established reputation about its optical image stabilization technology, about the query property structure configured as "image stabilization," "optical," and "manufacturer," higher rating information is added to the query property 442 "Manufacturer A" constructing the query property 342 "manufacturer" than to the query properties 442 for the other manufacturers. Thereby, when a plurality of pieces of provided information on digital cameras by manufacturers employing optical image stabilization are searched out in response to the query 41 "clear image," provided information related to Manufacturer A is rated higher, and as a result, for example, the provided information on the piece of merchandise by Manufacturer A can be presented higher in the search result list than merchandise by the other manufacturers. In other words, pieces of provided information on digital cameras which employ optical image stabilization and are included in the search result list are presented in such a manner that the piece of merchandise by Manufacturer A is presented higher, so that the order in which the pieces of provided information are presented in the list reflects the query "clear image."

Figure 15:
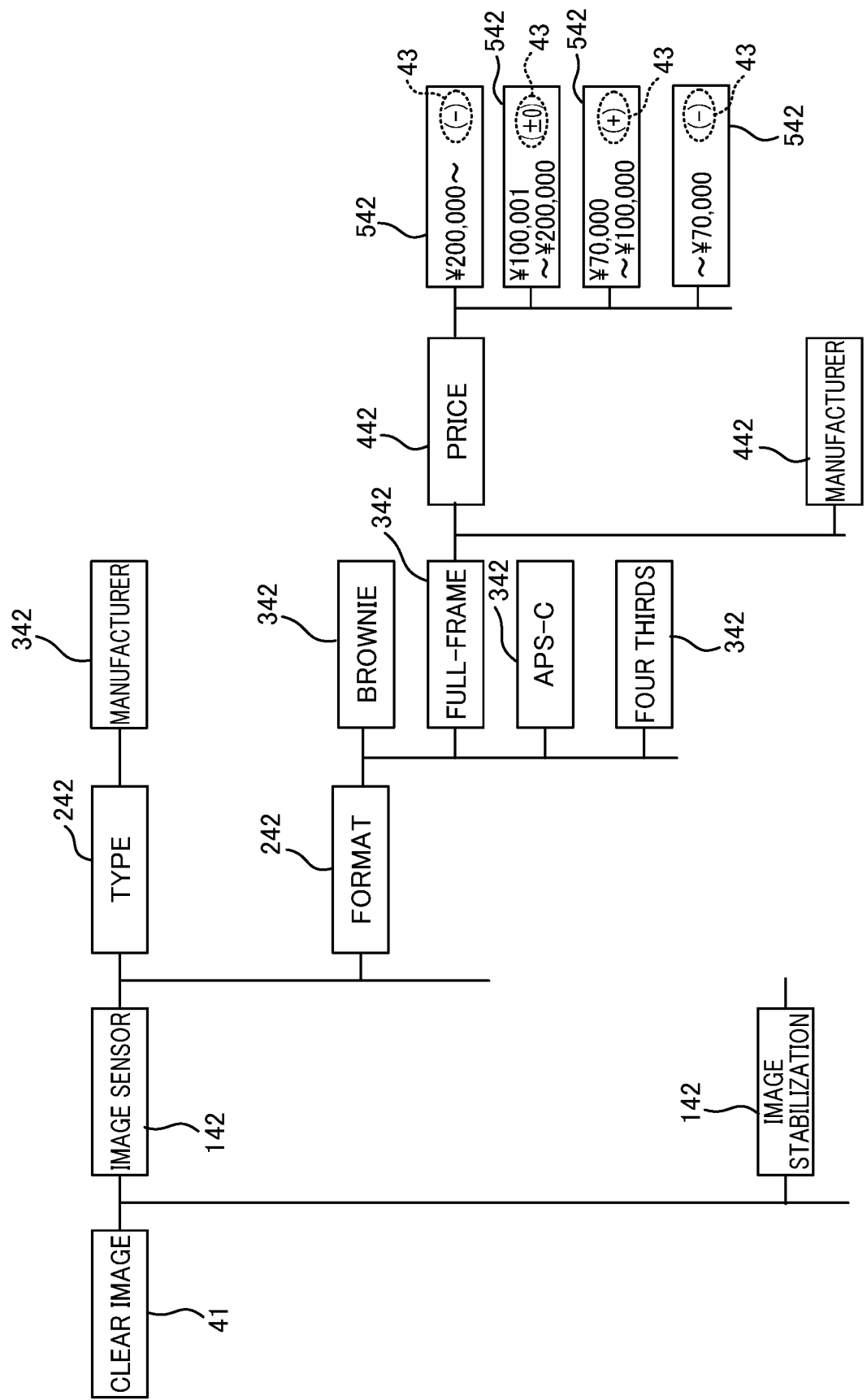
FIG. 15 is a diagram illustrating another example of a layered structure of the query database.

FIG. 15 illustrates an example for better illustration of the advantageous effect obtained by adding rating information to query properties in the layer-structured query database. As illustrated in FIG. 15, in a query property structure formed by "image sensor" 142 and "format" 242 traced from the upper layer, the second-layer query property 242 is associated with, as its constituents, query properties 342 defining the formats of the image sensor. The third-layer query property 342 "full frame" is further associated with "price" as a fourth-layer query property 442. Then there is a fifth layer having query properties 542 for specific price ranges, each of which has rating information 43 added thereto. Thus, provided information for a query "clear image" extracted on the basis of the query property structure configured as "image sensor," "format," "full frame," and "price" is rated on the basis of the prices set for digital cameras with full-frame image sensors. Then, digital cameras with full-frame image sensors are rated high (+) if they are in the ¥70,000 to ¥100,000 price range, because they have good performance and are a "bargain," so to speak. On one hand, digital cameras in the ¥100,001 to ¥200,000 price range are rated (±) because they are "fairly priced," so to speak. On the other hand, digital cameras at ¥200,000 or higher are high-end cameras or a bad bargain, and are not suitable for a user who is making the search by inputting "clear image" as a query. In other words, users who want a digital camera in the ¥200,000-or-higher price range should be knowledgeable about cameras, and should be searching for a piece of merchandise on the basis of a different query. Further, digital cameras that have full-frame image sensors and cost ¥70,000 or less should be doubted to be "flawed merchandise," so to speak, having some kind of problem (such as a piece of returned and fixed merchandise or an unknown manufacturer). In this way, a query property "price," which is of different nature from a query property "image sensor" of a digital camera, is associated, and rating information is added to each specific price range. Thereby, when a plurality of pieces of provided information on digital cameras including full-frame image sensors are extracted for instance, their order of presentation can be determined by rating or extraction on the basis of the prices.

Provided information on a piece of merchandise is formed by a plurality of multi-aspect properties or information on the basis of those properties, the properties including what users gain, such as for example a feature, performance, a service, and an effect, and what users spend, such as cost and time. What is spent (e.g., the price) is collection of what is gained (e.g., a feature and performance), and what is gained and what is spent are in a trade-off relation. In this way, what is gained and what is spent form complicated configurations, structures, and relations. For example, seeking many features and high performance leads to a high price.

Meanwhile a query reflects a request of a user. Except for some one-aspect requests such as "I want apiece of merchandise with the highest resolution (the number of pixels)" or "I want the least expensive merchandise (price)," a request inputted to the information providing device as a query (hereinafter also referred to as a request (query)) may be, like provided information on apiece of merchandise is, formed by a plurality of multiple-aspect properties of what is gained (e.g., a feature and performance) and what is spent (e.g., price), such as "I want a piece of high-performance merchandise with many features at a reasonable price." What is spent is collection of what is gained, and what is gained and what is spent are in a trade-off relation. On the basis of such a multi-aspect request (query) by a user with a complicated configuration, structure, and relation, the information providing device of the present embodiment can rate or extract provided information in a unified manner using query properties constructing the query like the ones illustrated in FIG. 15 for example. Thus, in response to a fuzzy query from a user, the information providing device of the present embodiment can rate or extract provided information objectively on the basis of properties (query properties or merchandise properties).

Presentation of Query Properties and Merchandise Properties

The above embodiment has been provided to facilitate the understanding of the nature of the present invention. While the above embodiment achieves the largest goal of a user being able to obtain provided information that meets the user's objective or desire, it may be difficult for the user to understand the relation between the query that the user inputs on the merchandise search page 50 illustrated in FIG. 7 and the provided information 56 presented on the search result page 60a illustrated in FIG. 9. Thus, the information providing device may output, if deemed necessary, information used from input of a query to extraction of ultimately-presented provided information in order to allow a user to understand the relation between the query and the provided information. For example, if the search result page includes query properties and merchandise properties on the basis of which provided information has been extracted, the user can understand the relation between the query and the provided information extracted on the basis of the query.

Figure 16:
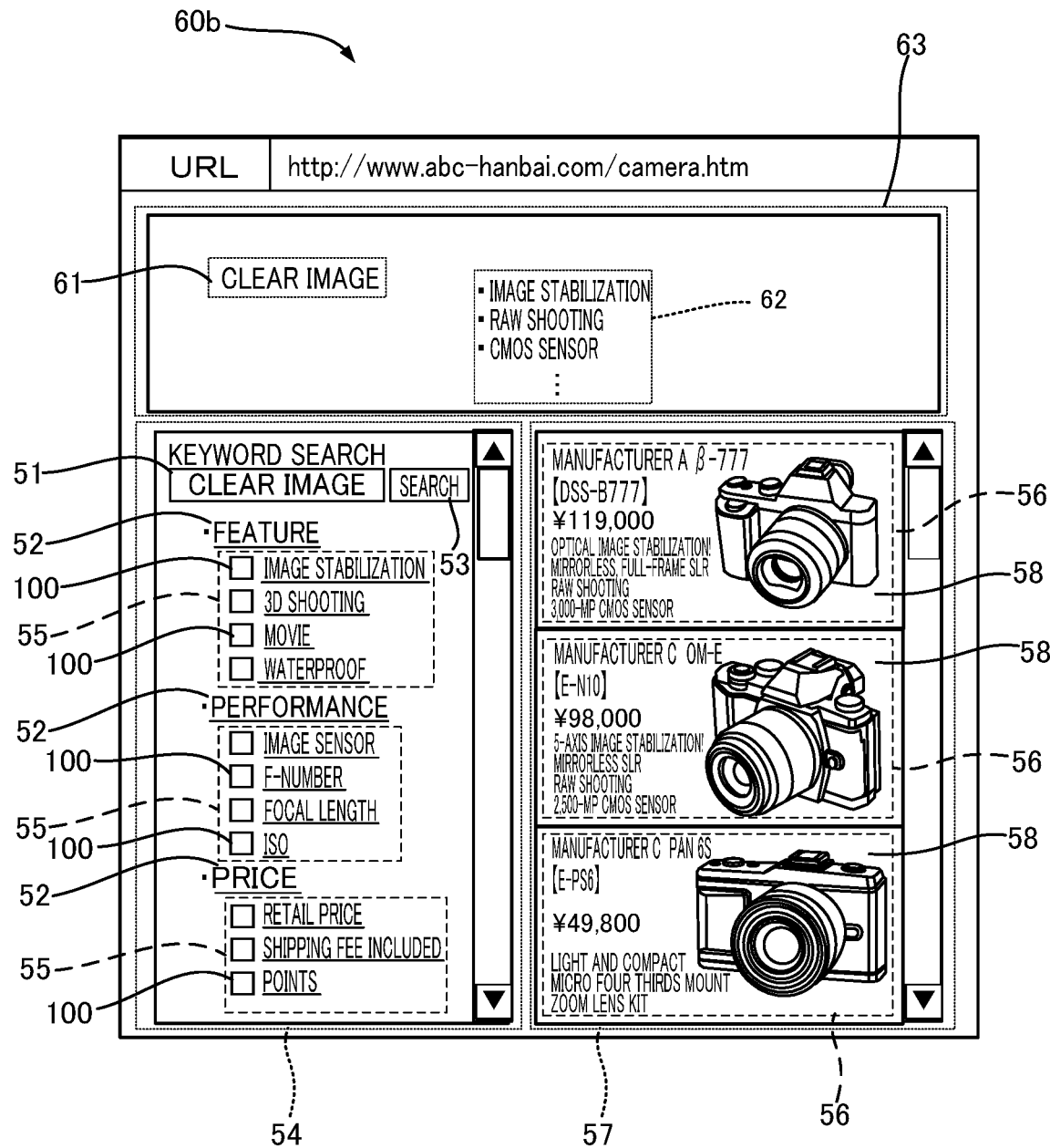
FIG. 16 is a diagram illustrating another example of the search result page.
Figure 17:
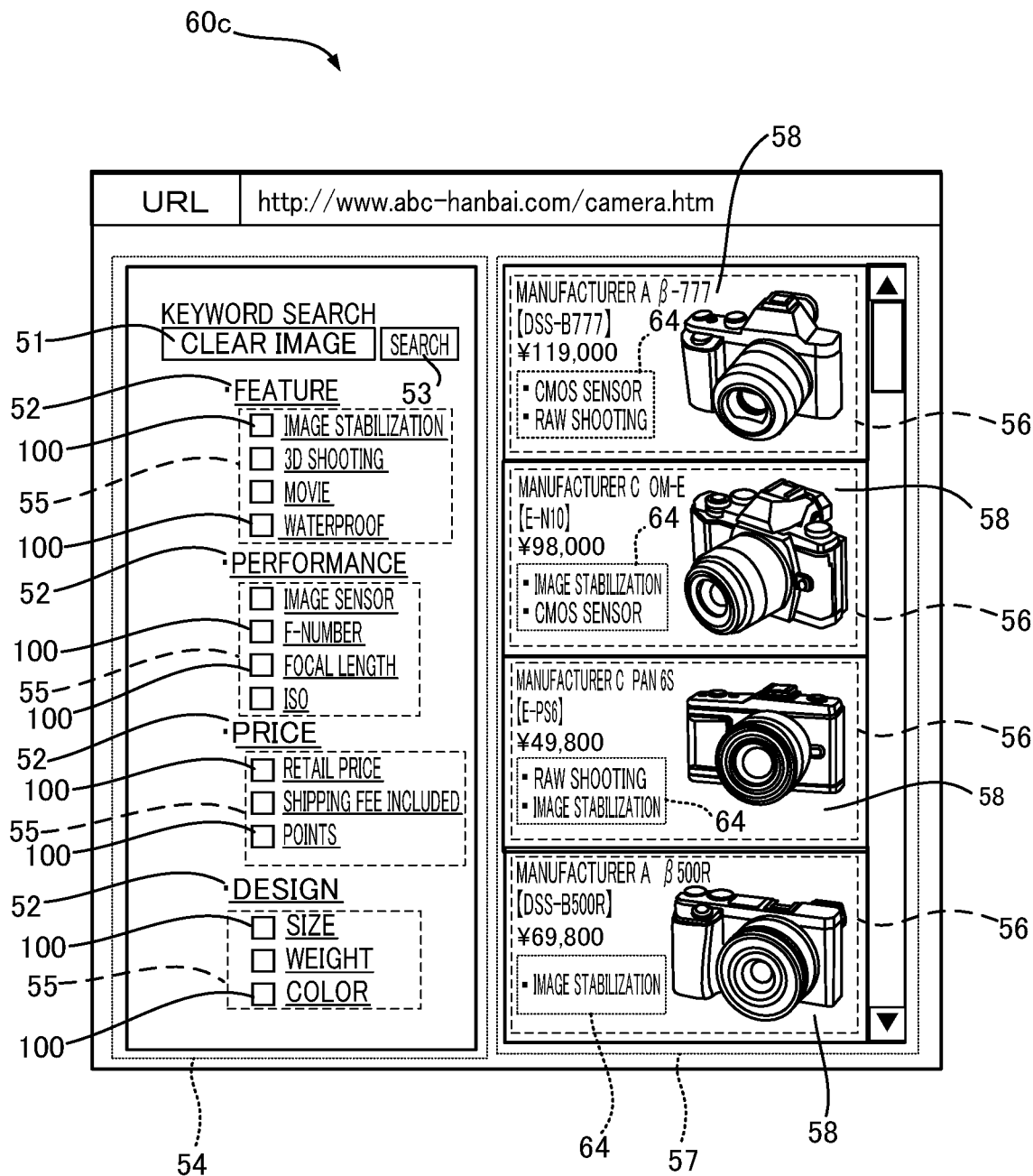
FIG. 17 is a diagram illustrating another example of the search result page.
Figure 18:
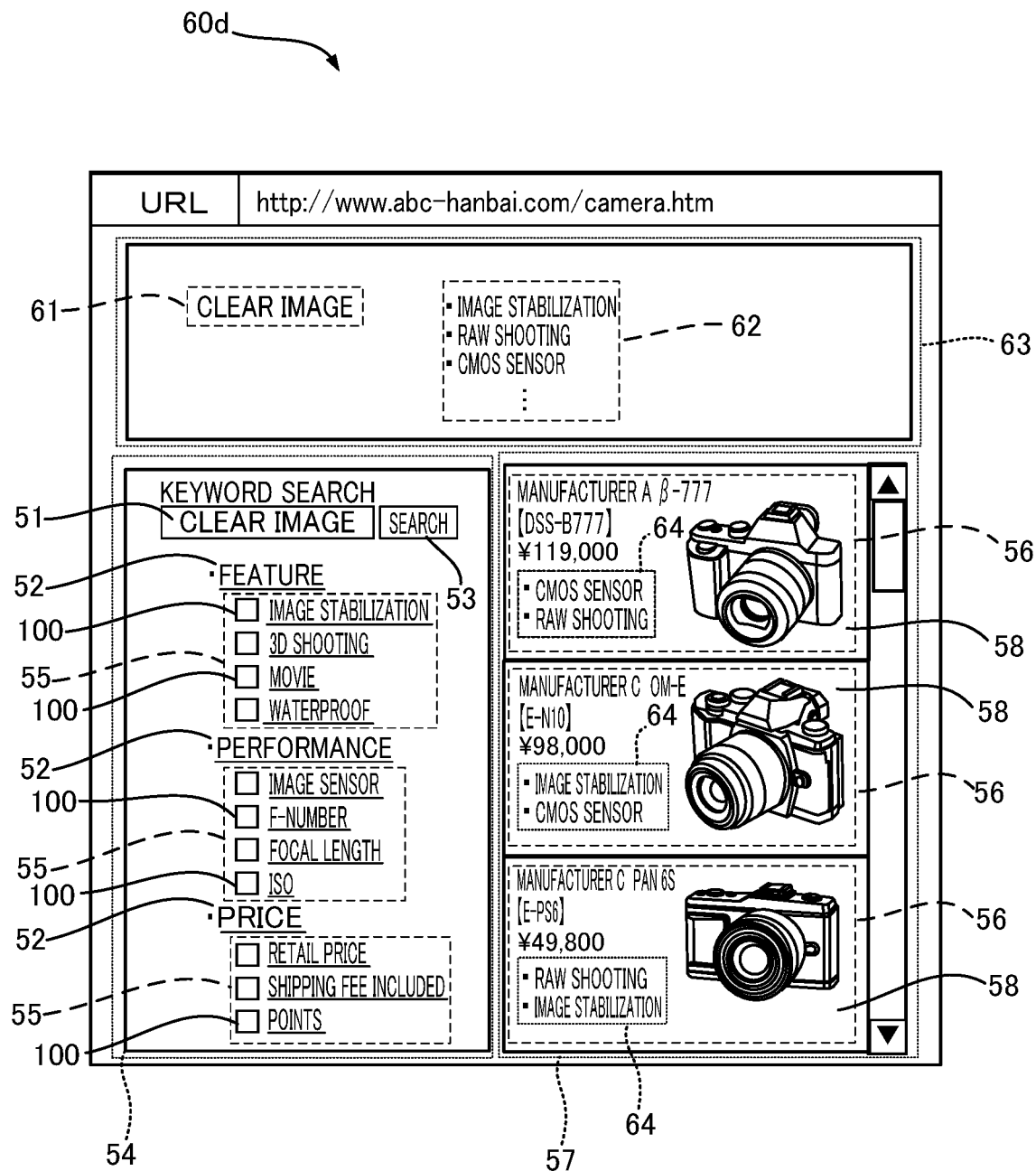
FIG. 18 is a diagram illustrating another example of the search result page.

FIGS. 16, 17, and 18 illustrate modifications of the search result page. A search result page 60b illustrated in FIG. 16 includes not only the query input field 54 and the list 57 of the provided information 56 like the search result page 60a in FIG. 9, but also a field 63 for showing the relations between a query 61 inputted by a keyword and query properties 62 used for extraction of the provided information 56. By checking the contents of the field 63, the user can understand what kind of query properties 62 were used for the information search on the basis of the user's query 61. If there are two or more queries, the relation between a query and query properties may be shown for each query, or query properties for the two or more query may be shown collectively. Further, the query properties shown in the relations between the query 61 and the query properties 62 may be the query properties constructing the query or ones of the query properties constructing the query that actually affected the rating or extraction of the provided information 56. Each query property may be presented with its relative merits on the basis of the level of influence on the rating or extraction. All or a predetermined number of involved query properties may be presented. Alternatively, only query properties that meet a predetermined condition may be presented. In a search result page 60c illustrated in FIG. 17, each display field 58 for provided information 56 includes, in place of a merchandise description, a merchandise property 64 associated with the provided information 56. The merchandise property 64 may be a merchandise property corresponding to the provided information, a query property used to rate the provided information, or a merchandise property rated on the basis of query properties constructing the query. Specifically, the merchandise property corresponding to the provided information may be the merchandise properties 32 in FIG. 10A, the query property used to rate the provided information may be the query properties 42a in FIG. 10A, and the merchandise property rated on the basis of the query properties constructing the query may be the merchandise properties 32a in FIG. 10A. On the basis of this information, the user can understand the merchandise properties 64 on the basis of which the provided information 56 have been extracted or rated in response to their query. A search result page 60d illustrated in FIG. 18 includes both the field 63 in FIG. 16 showing the relation between the query 61 and the query properties 62 used for the extraction of the provided information 56, and the merchandise property 64 used for extraction of the provided information 56 in each field 58 displaying the provided information 56. On the basis of these pieces of information, the user can know which one or ones of the query properties 62 of their query 61 match (or influence) the merchandise property 64.

Displaying query properties and/or merchandise properties on the search result page allows the user to be presented with and understand the relation between the query and the provided information. Displaying query properties and/or merchandise properties also removes the feeling of perplexity by the presentation of the provided information 56 abruptly as in the search result page 60a in FIG. 9. Allowing the user to be presented with and understand the relation between the query and the provided information means allowing the user to be presented with and understand the process of information search. For example, the user can come to understand the relation between the user's request "clear image" and the specific details (such as features and performance) of the piece of actual merchandise. Specifically, the user can understand the relation between their query and the provided information by being presented with the process of information search indicating that, for example, the user's request (query) "clear image" 61 is achieved by the property "image stabilization" 62 and that the provided information (merchandise) 56 includes the property "image stabilization" 64, or that the user's request (query) "clear image" 61 is met by the provided information (merchandise) 56 because the piece of merchandise has good property "image stabilization" 64. The more the user makes information search, the more the user comes to understand the relation between the query and the provided information, and the user will gain more and more knowledge about provided information such as merchandise knowledge through the merchandise searches. As the user gains more and more knowledge about provided information, the user becomes able to select a more accurate query and have a better chance of finding a piece of merchandise that meets their request.

Figure 19:
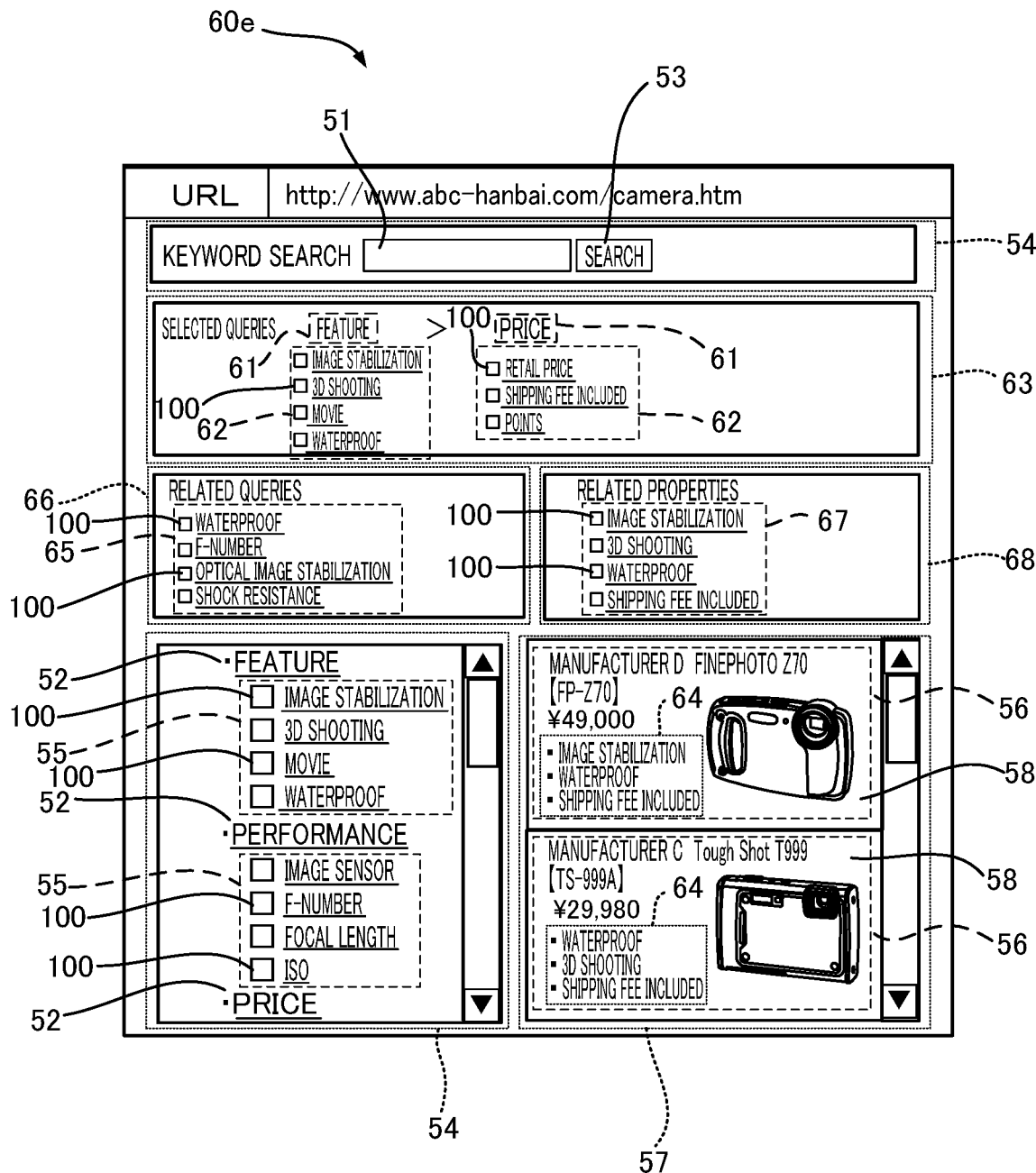
FIG. 19 is a diagram illustrating another example of the search result page.

It goes without saying that the layout of the search result page and information on properties (query properties, merchandise properties) presented on the search result page are not limited to the examples illustrated in FIGS. 9, 16, 17, and 18. Any configuration may be employed as a user interface. A search result page of any format may be used as long as it includes a query input field for receiving an input of additional query and a list of provided information, with query properties and/or merchandise properties being included in the query input field and/or each of the provided information display field in the provided information list or being shown in a separately-provided field(s). FIG. 19 illustrates another example of presenting query properties and merchandise properties on a search result page. FIG. 19 illustrates a search result page 60e displayed when more than one query 61 has been inputted. The search result page 60e includes not only the query input field 54 for inputting an additional query 61 and the provided information list 57 of the search results of the query 61, but also the field 63 including the queries 61 inputted by the user and the query properties 62 corresponding to each of the inputted queries 61, which is also illustrated in FIGS. 16 and 18.

In the search result page 60e, a field 66 for displaying related queries 65 and a field 68 for displaying related properties 67 are arranged side by side. The related queries 65 presented may be queries 65 related to the query 61 selected by the user, e.g., queries often selected together with the query 61 selected by the user, or more detailed queries associated with the query 61, e.g., queries associated in the lower layer. Alternatively, the related queries 65 presented may be queries 65 related to the provided information 56 presented in the provided information list 57 of search results. Or, the related queries 65 presented may be queries 65 related to the properties 62 related to the query 61, the properties 64 related to the provided information 56 presented in the provided information list 57, or the related properties 67. The related properties 67 presented may be a collection of the properties 64 related to the provided information 56 pieces presented in the provided information list 57 as search results. Alternatively, the related properties 67 displayed may be a collection of the properties 62 related to the queries 61 selected by the user. The properties 67 related to the related queries 65 may be presented instead. The relation between the query 61 selected by the user and the search results is expressed not only by the provided information 56 presented in the provided information list 57, but also by the presentation of the related queries 65 and the related properties 67. Thus, the user can see the relation between the query 61 selected by the user and the search results by means of the provided information 56 presented in the provided information list 57 as well as the related queries 65 and the related properties 67.

Figure 20:
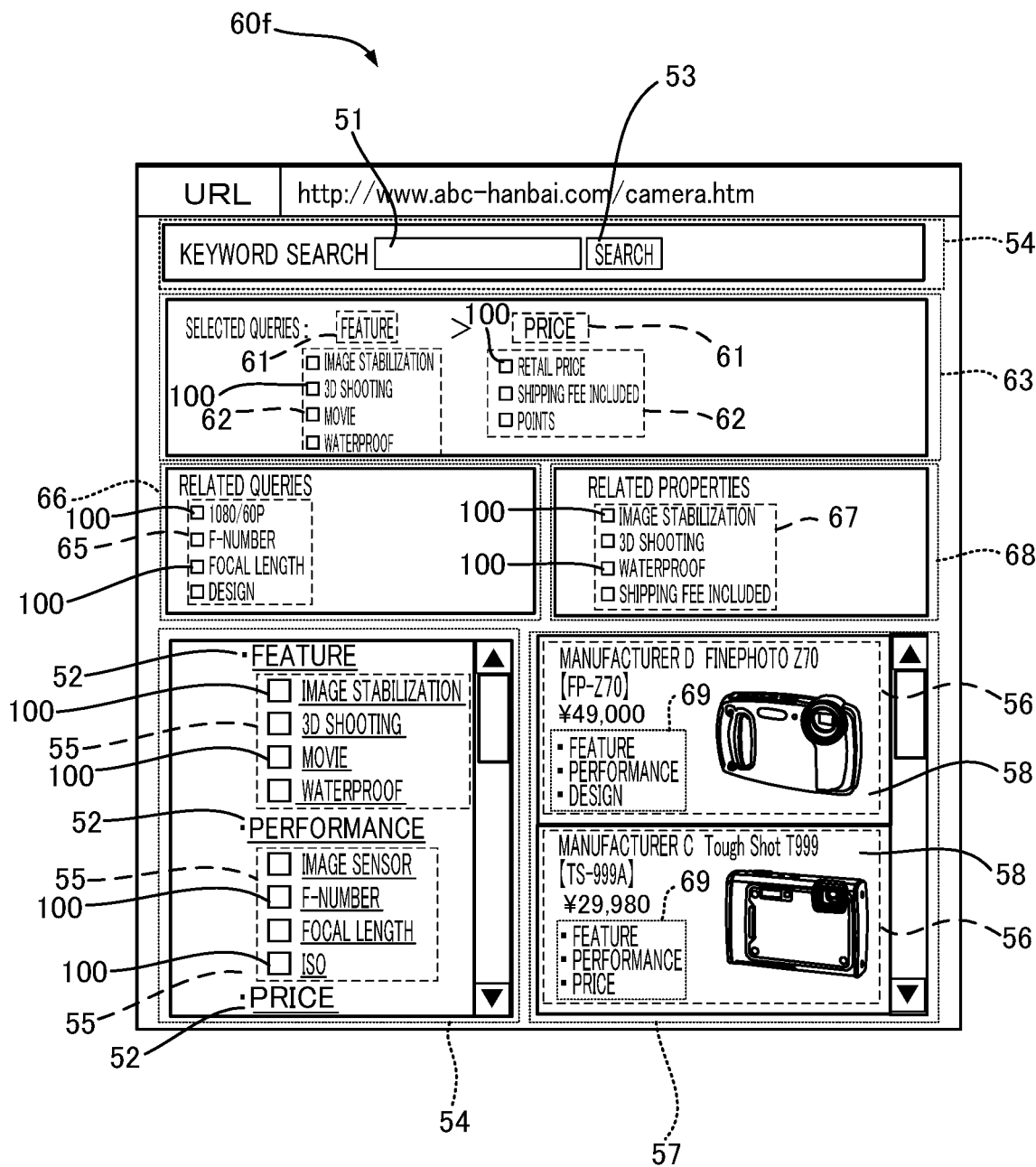
FIG. 20 is a diagram illustrating another example of the search result page.

A search result page 60f illustrated in FIG. 20 includes, in each provided information display field 58, the provided information 56 and either queries 69 which may be used to extract or rate the provided information 56 or queries 69 related to the provided information 56, in order to show the queries used to extract the provided information 56 presented as a search result. Specifically, the queries 69 presented may be queries 69 related to the provided information 56 or the queries 69 on the basis of the merchandise properties related to the provided information 56 (the properties of the provided information). Further, as will be described later, the provided information 56 may be inputted as a query, and the queries 69 may be presented as provided information. Queries presented as the queries 69 may be all of the appropriate queries or a predetermined number of them. Further, the queries may be presented in an order on the basis of rating conducted for extraction or rating of the provided information 56, or may be presented on the basis of a predetermined condition. Of course, criteria for rating queries to be presented as the queries 69 may be defined separately and used to rate the presentation order or condition. For a user who cannot understand properties well, presenting queries may help them understand better. Specifically, for example, the provided information 56 presented as a search result in response to a request (query) "feature" 61 by a user can be presented along with the process of information search for the user's request (query) in a collective manner. For example, the process of information search may be such that: the query 69 "feature" satisfies a predetermined condition on the basis of the properties 62 (image stabilization, 3D shooting, . . . ) constructing the query 61 "feature"; the user's request (query) 61 "feature" is offered by the provided information 56 because the query 69 "feature" is better than the other queries; or, for example, besides the query 61 requested by the user, the queries 69 "performance" and "design" of the provided information 56 are better than the other queries.

Figure 21:
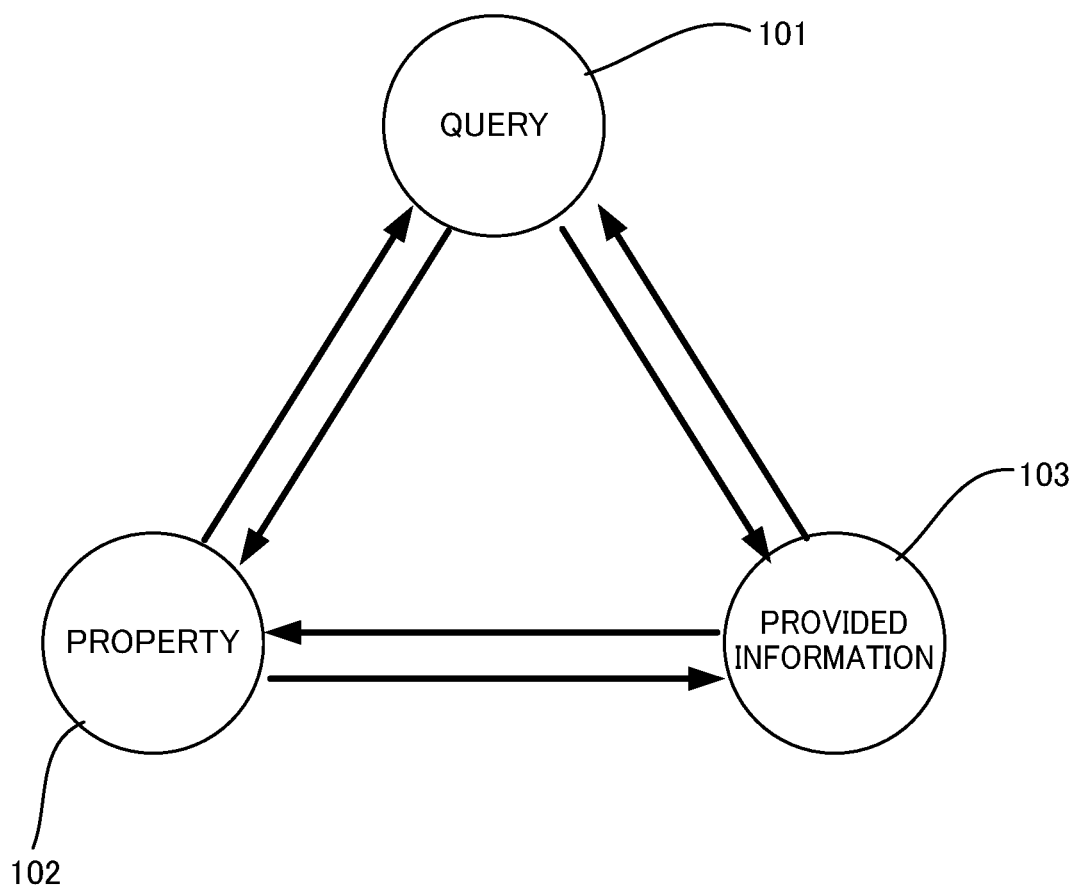
FIG. 21 is a diagram illustrating the general idea of how the information providing device according to the embodiment of the present invention operates.

The search result pages described above may present queries, query properties, merchandise properties, and provided information in any manner. However, these pieces of information can be presented only if the databases have structures such that queries, pieces of provided information, and properties connecting the queries and the pieces of provided information (query properties, merchandise properties) are related to one another in a multi-aspect manner. FIG. 21 is a diagram illustrating the configuration and operation of the information providing device according to the embodiment of the present invention, and illustrates the basic concept of the information providing device concerning the database structures, the information search procedure on the basis of the structures, and the operation of presenting information search results. As illustrated in FIG. 21, properties 102 related to a query 101 inputted by a user include both query properties and merchandise properties compared with (or rated on the basis of) the query properties. Further, provided information 103 is extracted as a result of the comparison/rating, and is associated with the query 101. In other words, without the correlating database structure, various pieces of information cannot be shown on a search result page. By being presented with these pieces of information every time a user conducts information search, the user becomes able to understand the correlation between their query and provided information.

Generation of Query Properties

The configuration or structure of query properties on the basis of a query is built and prepared in advance. In the above embodiment, for example, a query "clear image" is associated with predetermined query properties from the beginning. However, a query "clear image" by one user and a query "clear image" by another user may have different requests behind the queries. For this reason, for example, the association between a certain query and query properties is set subjectively by more than one person knowledgeable about merchandise to prepare a plurality of associations between the certain query and query properties. Then, the ultimate relation between the certain query and query properties, i.e., the association between a query actually sent from a user terminal and query properties used to make an inquiry to the provided information database, may be determined on the basis of the plurality of associations. In other words, a single query database may be built from a plurality of query databases.

Figure 22A:
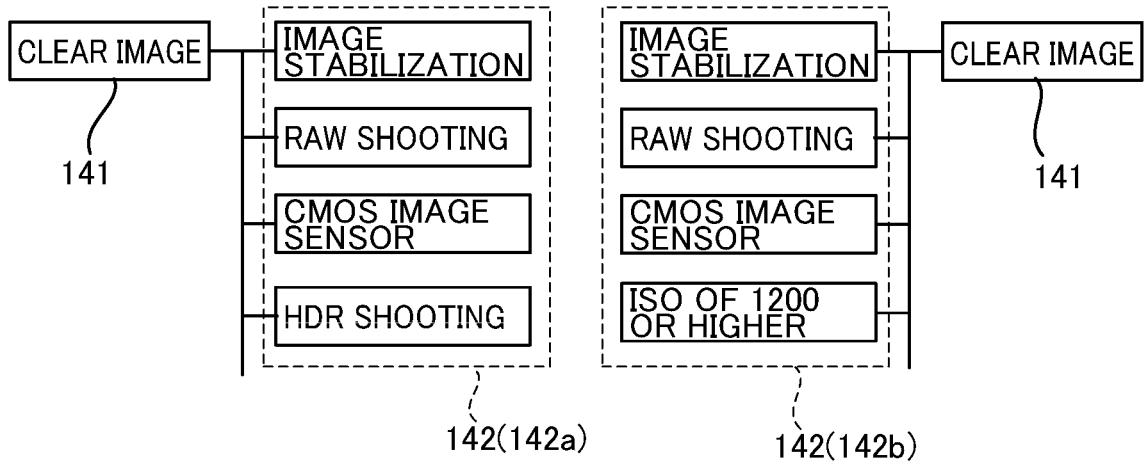
FIG. 22A is a diagram illustrating an example of a procedure of building the query database.
Figure 22B:
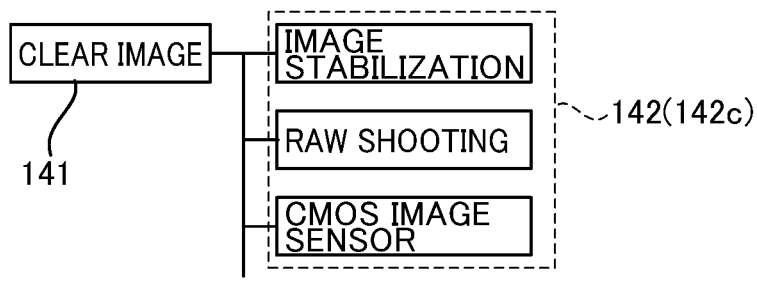
FIG. 22B is a diagram illustrating an example of a procedure of building the query database.
Figure 22C:
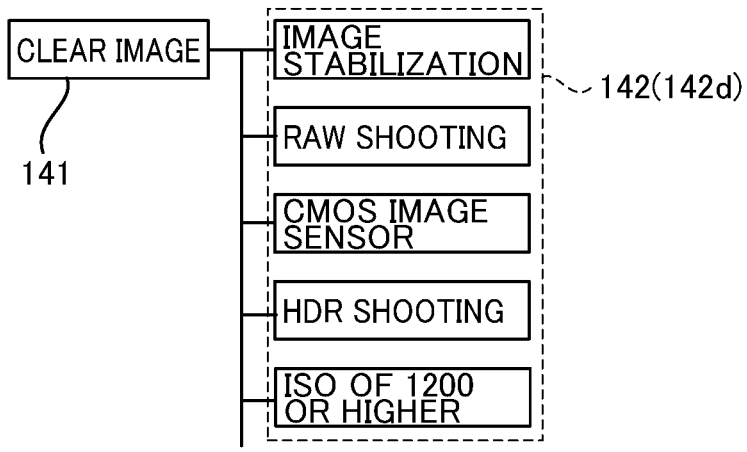
FIG. 22C is a diagram illustrating an example of a procedure of building the query database.
Figure 22D:
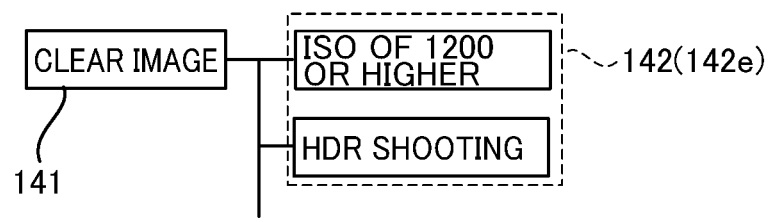
FIG. 22D is a diagram illustrating an example of a procedure of building the query database.

FIGS. 22A, 22B, 22C, and 22D exemplify how to build a single ultimately-used query database using a plurality of query databases. For example, when there are two ways of association between a query 141 "clear image" and query properties (142a, 142b) as illustrated in FIG. 22A, the ultimate association between the query 141 and the query properties 142 may include all the query properties 142d in the two ways of association as illustrated in FIG. 22C. This approach associates a single query with as many query properties as possible and therefore is expected to prevent useful provided information from being excluded from the list. The approach illustrated in FIG. 22B uses only matching query properties 142c so that a certain query may be associated with the most pertinent query properties. This approach is thus expected to prevent extraction of an enormous amount of provided information. Further, as illustrated in FIG. 22D, query properties 142e that do not match each other may be used as ultimate query properties. In this query property data building method illustrated in FIG. 22D, on one hand, the relations between a query and query properties that are generally thought of as common are ignored, and rare query properties are associated with each query. Thus, this approach has a downside such that an extremely small number of pieces of provided information are extracted, offering only a small number of options for the user. On the other hand, since rare query properties are very characteristic query properties, this approach may be able to present accurately the provided information that meets the request of the user hidden in the query. Note that if the ultimate query properties are to be assigned rating information, the rating information may be set in any appropriately way. For example, rating information may be added to the ultimate query property separately. Alternatively, rating information is associated with each query property beforehand in each of query databases. Then, for an ultimate query property, if the query property is shared by the query databases, the average value of the pieces of rating information on the respective query properties is used, and if the query property is not shared, the original rating information on the query property is used.

Using Both "Rating" and "Refinement" of Provided Information on the Basis of a Query By connecting a query and provided information through the medium of properties, the information providing device according to the embodiment of the present invention described above can present, even to a user who does not understand the relation between the query and the provided information, the provided information that includes the user's potential purpose or request in the query after rating or extracting the provided information. Or, the information providing device can rate pieces of provided information including a user's potential purpose or request included in a query, identify provided information on the basis of the rating result, and present the provided information. Further, by rating provided information in a unified manner on the basis of multi-aspect queries, the information providing device can present pieces of provided information on the basis of the query in order of ratings, irrespective of whether the pieces are refined. Meanwhile, the following process is also possible. That is, even if a user's request is unspecific and abstract at first, part of the request becomes specific along the way, leading to coexistence of a specific request and an abstract request, a particular piece of provided information is reached, and the request is thus determined.

A request inputted to the information providing device as a query is described as a "request (query)" above. Further, herein, information on apiece of merchandise that meets the request (query) is provided information. In the following, when provided information outputted by the information providing device is described as "provided information (merchandise)," in a case where a user's request is unspecific and abstract, provided information (merchandise) that does not meet the abstract request (query) is targeted for comparison/rating. However, once the request becomes specific even partially, provided information (merchandise) that does not meet the specific request (query) becomes noise and is not targeted for comparison/rating. In this way, there may be a query that refines provided information (merchandise) and a query that does not refine provided information (merchandise).

When pieces of provided information (merchandise) are refined on the basis of a query, there may be a case where refined pieces of provided information (merchandise) have no difference in their ratings and are therefore not targeted for rating. Specifically, assume a case where the "image stabilization" feature of provided information (merchandise) is rated either "equipped" or "not equipped," and that pieces of provided information (merchandise) are refined to ones "equipped" with the "image stabilization" feature. Then, all the refined pieces of provided information (merchandise) are "equipped" with the "image stabilization" feature, and are not targeted for rating because they have no difference in terms of that query. When a user's request is clear and specific, the query may be a precondition for the user and not targeted for rating. At the same time, when a user's request (query) is abstract, all the pieces of provided information (merchandise) may be targeted for search or extraction and cannot be refined.

Specifically, when pieces of provided information (merchandise) are searched for or extracted on the basis of an abstract query such as "feature," the pieces of provided information (merchandise) cannot be refined because, for example, all of them include "feature." Then, the user's request (query) may become complicated, including both an abstract request and a specific request. For the reasons above, queries mixed with an abstract query and a specific query are separated into one that "refines" and one that "rates" provided information (merchandise), so as to set queries that refine provided information (merchandise) and ones that do not and to set queries that rate provided information (merchandise) and ones that do not. Specifically, four patterns "α" to "δ" illustrated in the following Table 1 are conceivable.

TABLE 1

| α | Provided information pieces are not refined on the basis of a query: A query is not targeted for rating of provided information. |
|---|---|
| β | Provided information pieces are not refined on the basis of a query: A query is targeted for rating of provided information. |
| γ | Provided information pieces are refined on the basis of a query: A query is not targeted for rating of provided information. |
| δ | Provided information pieces are refined on the basis of a query: A query is targeted for rating of provided information. |

In "α," no processing is performed on the basis of a query. In "δ," provided information pieces are refined on the basis of a query, and the query is targeted for rating of provided information. Processing by a technology similar to that for a conventional search engine or the like is performed. The present embodiment employs "β" for an abstract request (query) and "γ" for a specific request (query), and achieves "δ" by providing user interfaces for requests mixed with an abstract request (query) and a specific request (query).

Specifically, an abstract request (query) is handled as a "rating query" using "β" in which pieces of provided information (merchandise) are not refined on the basis of the query and the query is targeted for rating of the pieces of provided information (merchandise). A specific request (query) is handled as "γ" in which pieces of provided information (merchandise) are refined on the basis of the query and the query is not targeted for rating of the pieces of provided information (merchandise). Then, user interfaces are built to be able to set a combination of the "rating query" and the "refinement query," so that both a "rating query" and a "refinement query" can be received as queries. Pieces of provided information (merchandise) are refined on the basis of the "refinement query" and rated on the basis of the "rating query," thus achieving "δ" in which pieces of provided information are refined on the basis of a query and are rated on the basis of another query. Of course, for a specific request (query), a single query may be received as a "refinement query" and a "rating query" as "δ" in which pieces of provided information (merchandise) are refined on the basis of a query and are rated on the basis of the same query.

In this way, the information providing device may be capable of receiving both a query corresponding to a user's unspecific request, i.e., a "rating query" for rating provided information, and, like the refinement query, a query reflecting the clear intention of the user, i.e., an "extraction query" for identifying provided information to be extracted. Note that an extraction query is not limited to a refinement query, and may be, for example, information specifying the number of pieces of provided information to be outputted out of pieces of provided information rated on the basis of a rating query.

Figure 23:
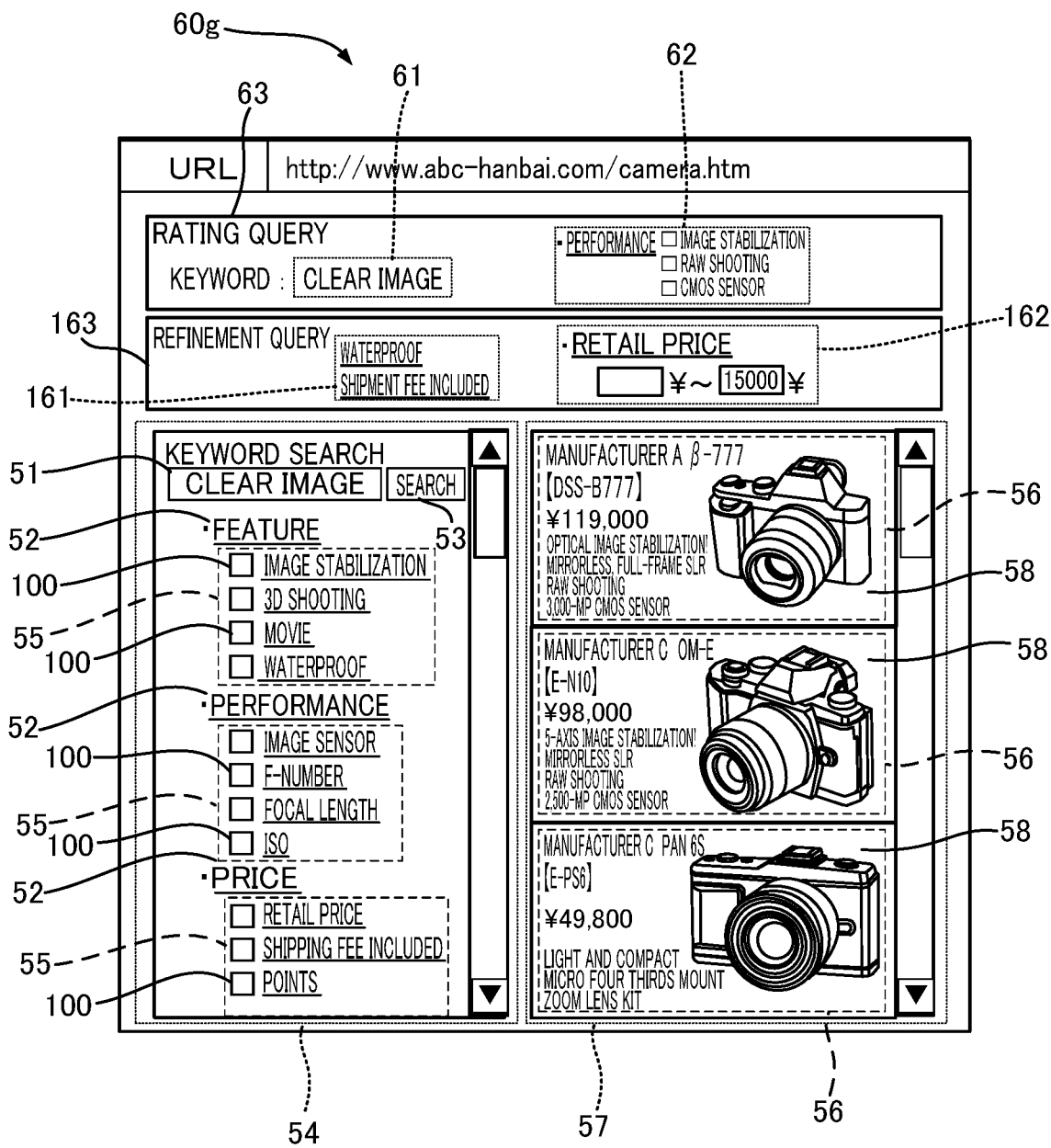
FIG. 23 is a diagram illustrating another example of the search result page.

Next, the following illustrates a specific example of user interfaces used when the information providing device outputs provided information on the basis of a rating query and an extraction query, the example using a refinement query as the extraction query. As illustrated in drawings such as FIGS. 7, 9, 16, 17, 18, 19, and 20, in the information search page 50 and the search result page (60a to 60f), the underlined character strings, such as the queries 52 and the query properties 55 selectable as queries, are disposed as "rating queries," and the checkboxes 100 are added to the respective character strings of the query properties 55 as "refinement queries." For example, when the underlined query 52 "feature" is chosen, the pieces of provided information are not refined on the basis of the "rating query," but rated on the basis of the query properties 55 constructing the query 52 "feature," namely, "image stabilization," "3D shooting," "movie," and "waterproof," and are then presented in the order of the ratings. Then, if, for example, the checkbox 100 next to the character string "waterproof" of the query property 55 under the character string "feature" of the query 52 is chosen, the query property 55 serves as a "refinement query" to refine the pieces of provided information (merchandise) to ones that are "waterproof" on the basis of the merchandise properties or details of the provided information, and the refined pieces of provided information are presented in the provided information list. Note that a user may check a checkbox when refining provided information, or, with all the checkboxes being checked in advance, uncheck a checkbox by selecting one to remove. Then, provided information may not be rated on the basis of "waterproof" indicated as the "refinement query", or may be rated on the basis of the "refinement query." For example, assume that, using "waterproof" as a "refinement query," pieces of provided information on merchandise including "waterproof" as a merchandise property are extracted. In such a case, in conventional technologies, the pieces of provided information do not have any difference about "waterproof" and are therefore not targeted for rating. By contrast, the present embodiment can rate each piece of provided information on the basis of more-detailed, drilled-down query properties constructing the query, such as "water resistant" and "waterproof to a depth of 100 m," or rate each piece of providing information by unifying multi-aspect elements (properties) of "waterproof" and "price." Then, the ratings of the pieces of provided information can be presented by means of the "order of presentation," the "query properties," or the "queries" of the provided information. Note that a search result page may be provided with, like a search result page 60g illustrated in FIG. 23, not only the field 63 which shows a history of, or what is called a "breadcrumb navigation" of, rating queries (61, 62) inputted with text or selected by a user, but also a field 163 for showing refinement queries (161, 162) selected or specified with numeral values by a user. Thereby, the user can see their unspecific request and their clear intention by means of the rating queries and the extraction queries inputted by the user.

The information providing device of the present embodiment is thus configured to make it possible to set both rating and refinement of provided information on the basis of a query by using an interface for the "refinement (check-boxes)" of provided information and an interface for the "rating (underlined)" of provided information. This configuration allows a user to speedily reach information useful to the user, regardless of whether their purpose or request is, in the process of information search, abstract, specific, or mixed with an abstract request and a specific request. In other words, the information providing device according to the present embodiment, at first, rates and presents provided information including a user's potential purpose or request on the basis of an unspecific query. Thus, without having to rate or compare and rate each piece of provided information or a rating thereof presented upon each information search, the user can come to be able to understand what kind of information provided information to be refined includes, and as a result, provided information to refine, i.e., the user's own request, can be clarified. Note that the interfaces for "refinement" and "rating" of provided information are not limited to a "checkbox" and an "underline (link)," and may be anything that can be distinguished by different inputs, such as a mouse's "single click," "double click," "left click," or "right click," or different operations on the touch screen of a smartphone or the like (e.g., types of gestures or the number of fingers to touch at the same time).

Other Embodiments

As an example of an information processing procedure of outputting provided information on the basis of a query, the above embodiment describes an example of outputting a provided information list to a user terminal according to a query received from the user terminal. However, the nature of the technical idea of the present invention lies in the information processing procedures and database structures for determining the associations between queries and provided information, and for example, associations between queries and provided information (index database) may be prepared in advance of receipt of a query from a user terminal. Specifically, query properties in a query database and merchandise properties in a provided information database are compared with each other, and data representing the associations between queries and provided information on the basis of the comparison results are prepared in advance. Then, the data may be updated as necessary every time provided information or an association between a query and a property is newly created, deleted, or changed. Further, if an association between a query and provided information is built by the medium of query properties and merchandise properties, address information (such as URL) on the provided information may be associated with the query properties and merchandise properties. Alternatively, the address may be associated with the query as one of its query properties. Of course, not only the associations between queries and provided information, associations between queries, provided information, and query properties or properties of the provided information, associations between queries, provided information, and related queries, or associations between queries, provided information, query properties or properties of the provided information, and related queries may be prepared in advance as an index database.

That associations between queries and provided information are built in advance means that a query may be inputted to the information providing device without being inputted by a user. Specifically, the information providing device of the present embodiment of the present invention stores queries expected to be inputted by users to a query database from user terminals via a communication network such as the Internet. Thus, for each of the queries stored in the database, an association between the query and provided information can be created in advance on the basis of query properties and merchandise properties.

Note that it goes without saying that the present invention is not limited to applications for merchandise search at an online-store as described above, and is also applicable to general information search. Moreover, a user input is not limited to information intentionally inputted by a user. For example, at a members-only website, using information such as a user's personal information (sex, age, occupation) or a merchandise ID as a query, various types of provided information can be presented, such as advertisements, placement of merchandise or services (such as insurances, outplacement, or restaurants). If a device used is a portable terminal that outputs location information, the current location may be used as a query. Of course, hardware forming the information providing device may be stand-alone, i.e., does not necessarily have to be connected to a network.

As described, in the information providing device according to the present embodiment, as illustrated in drawings such as FIG. 7, the character strings indicating the query properties (such as for example "image stabilization") 55 constructing a user-selectable query (such as, e.g., "feature") 52 are underlined so that a character string of the query properties 55 can be inputted as a query. To implement such a function, it is conceivable to prepare, in the query database illustrated in FIG. 5 for example, a query "waterproof" as another one of the queries such as "clear image," "feature," and "performance." In a case of the layer-structured query database illustrated in FIG. 14 for example, query properties are scattered at different layers, and thus when a character string "image stabilization" is specified as a query, the first-layer query property 142 "image stabilization" may be used as a query, and an inquiry to the provided information database may be made using its lower-layer query properties (242, 342, 442). In other words, once a query property is specified as a query, the structure of its lower-layer query properties may be directly used as information used to inquire to the provided information database.

Query, Property, and Provided Information

Regarding a query, a property, and provided information, the above embodiment describes an example where a query is related to a piece of merchandise, and a property is related to a piece of merchandise (a query property, a merchandise property), aiming to output merchandise information as the provided information. However, information wanted by a user is not necessarily merchandise information. Calling information related to a piece of merchandise "merchandise information," a request related to a piece of merchandise a "merchandise query," and a property related to a piece of merchandise a "merchandise property" here, all of the "merchandise information," the "merchandise query," and the "merchandise property" can be provided information wanted by a user, and depending on the provided information outputted, any of the "merchandise information," the "merchandise query," and the "merchandise property" can be a property or a query. In a further example, if a "merchandise query" is outputted as provided information as information wanted by a user, the "merchandise information" may be used as a query and the "merchandise property" may be used as a property, or the "merchandise property" may be used as a query and the "merchandise information" may be used as a property.

If a "merchandise query" is used as provided information, "merchandise information" is used as a query, and a "merchandise property" is used as a property, an association between the "merchandise query" and the "merchandise property" forms the provided information database, and an association between the "merchandise information" and the "merchandise property" forms the query database. Then, for example, using one or more pieces of "merchandise information" as a query or queries and a "merchandise property" corresponding to the "merchandise information" as a query property, the "merchandise property" is compared with the "merchandise property" corresponding to the "merchandise query" to, for example, rate or extract the "merchandise query" and output the "merchandise query" as provided information. In this way, a query, a property, and provided information are not limited to a request on a piece of merchandise, a merchandise property, and merchandise information.

Figure 24:
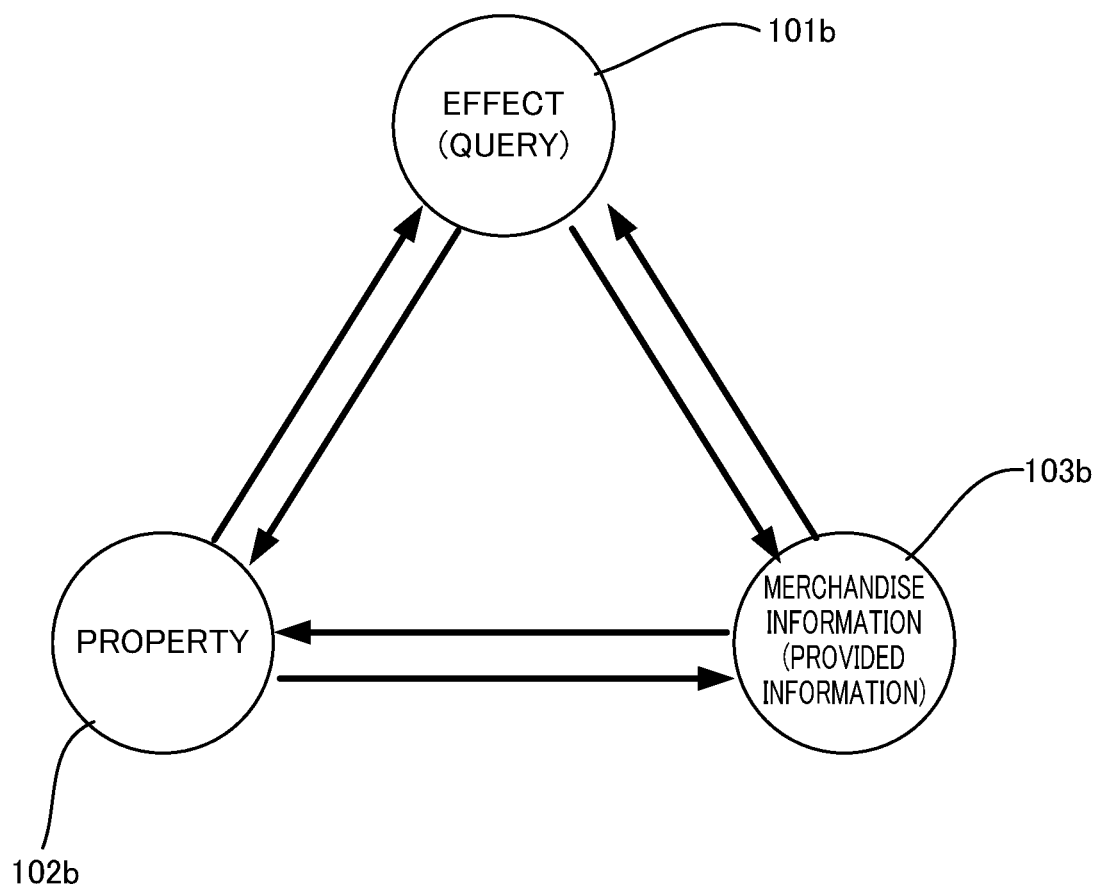
FIG. 24 is a diagram illustrating the general idea of how the information providing device according to an embodiment of the present invention operates.

Here, assume that a merchandise query is regarded as a beneficial effect, such as a user's request or benefit, that the user obtains as a result of information processing by the information providing device. Then, as illustrated in FIG. 24, when an effect desired by the user, e.g., a keyword such as "clear image," is inputted as a query $101b$, the information providing device outputs merchandise information $103b$ on the basis of a rating of a property $102b$ related to the effect. Note that the concept of information processing by the information providing device illustrated in FIG. 24 is similar to that illustrated in FIG. 21.

Figure 25:
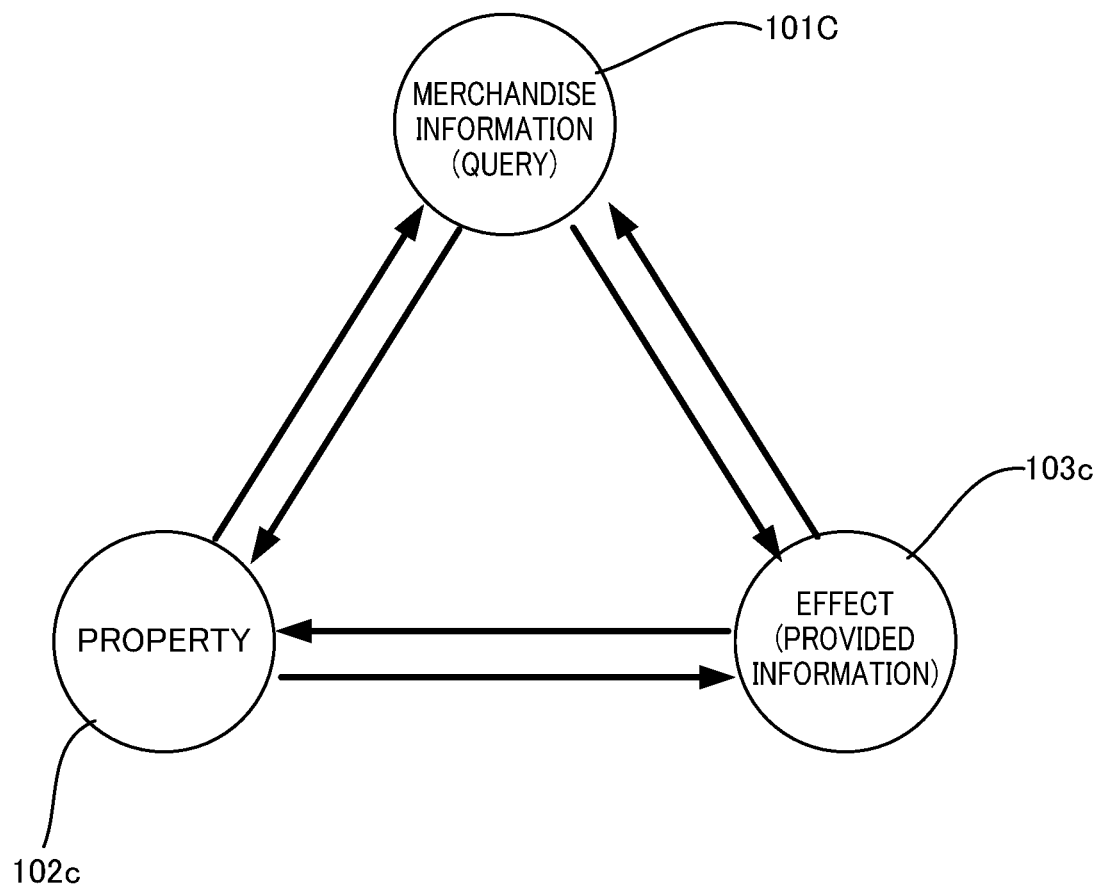
FIG. 25 is a diagram illustrating the general idea of how the information providing device according to an embodiment of the present invention operates.

For example, when certain merchandise information is presented on the basis of a query inputted by a user at first, the merchandise information may be inputted as the next query. In such a case, as illustrated in FIG. 25, when merchandise information $101c$ is inputted to trigger information processing, an effect (e.g., "clear image") brought about by a property $102c$ added to or associated with the merchandise information (e.g., such as "image stabilization") is outputted as provided information $103c$. Also, on the search result page $60f$ in FIG. 20, the queries 69 presented in the provided information display fields 58 presenting the provided information 56 as search results may be queries 69 (the provided information $103c$ in FIG. 25) regarding the provided information 56 (the merchandise information $101c$ in FIG. 25) as a query. In other words, a query, a property, and provided information are not limited to having particular information. Input information is a query, and output information is provided information. Then, a property is information that links the input information to the output information by being associated with and compared with the input information or the output information. The provided information database and the query database are also not limited to any particular information contents, and databases referred to for queries and provided information may be set appropriately. Note that the provided information database, the query database, or the index database may be separate databases or a single database, as long as associations between queries and properties (merchandise properties) and associations between provided information and properties or associations between queries and provided information are identifiable.

What is claimed is:

1. An information providing device that outputs provided information to be provided to a user, the information providing device comprising:
    a storage that stores:
        provided information including a content of a product or service; and
        potential queries that are expected to be input from a user terminal and that are each associated with a plurality of properties including the content of the product or service, wherein the properties are information to be collated, instead of a query input from the user terminal or the potential queries, with the provided information, and the properties are stored as a layered structure including each of the potential queries as a top layer; and a control unit that is connected to the storage and that:

rates, for each of the potential queries, the provided information by collating at least one combination of the properties determined based on the layered structure with the provided information, and upon receiving one or more queries from the user terminal, outputs, to the user terminal, the provided information based on a rating result of the provided information for the potential queries corresponding to each of the queries received from the user terminal.

2. An information providing device that outputs provided information to be provided to a user, the information providing device comprising:

a storage that stores:

provided information including a content of a product or service; and potential queries that are expected to be input from a user terminal and that are each associated with a plurality of properties including the content of the product or service, wherein the properties are information to be collated, instead of a query input from the user terminal or the potential queries, with the provided information, and the properties are stored as a layered structure including each of the potential queries as a top layer; and a control unit that is connected to the storage and that:

extracts, for each of the potential queries, the provided information by collating at least one combination of the properties determined based on the layered structure with the provided information, and upon receiving one or more queries from the user terminal, outputs, to the user terminal, the provided information based on an extracting result of the provided information for the potential queries corresponding to each of the queries received from the user terminal.

3. An information providing device that outputs provided information to be provided to a user, the information providing device comprising:

a storage that stores:

provided information including a content of a product or service; and potential queries that are expected to be input from a user terminal and that are each associated with a plurality of properties including the content of the product or service, wherein the properties are collated, instead of a query input from the user terminal or the potential queries, with the provided information, and the properties are stored as a layered structure including each of the potential queries as a top layer; and a control unit that is connected to the storage and that:

extracts, for each of the potential queries, the provided information by collating at least one combination of the properties determined based on the layered structure with the provided information, rates, for each of the potential queries, the provided information by collating at least one combination of the properties determined based on the layered structure with the provided information, receiving one or more extracting queries and one or more rating queries that are input from the user terminal, and outputs, to the user terminal, the provided information based on a rating result of the provided information for the potential queries corresponding to each of the received rating queries, the provided information being extracted for the potential queries corresponding to each of the received extracting queries.

4. The information providing device according to claim 1, wherein the control unit outputs information used in the course of outputting the provided information.

5. The information providing device according to claim 2, wherein the control unit outputs information used in the course of outputting the provided information.

6. The information providing device according to claim 3, wherein the control unit outputs information used in the course of outputting the provided information.

7. An information providing method by which a computer system including a storage and a control unit that is connected to the storage and that outputs provided information to be provided to a user, the method comprises the steps of:

storing, in the storage, provided information including a content of a product or service, and potential queries that are expected to be input from a user terminal and that are each associated with a plurality of properties including the content of the product or service, wherein the properties are information to be collated, instead of a query input from the user terminal or the potential queries, with the provided information, and the properties are stored as a layered structure including each of the potential queries as a top layer;

rating, for each of the potential queries, the provided information by collating at least one combination of the properties determined based on the layered structure with the provided information; and upon receiving one or more queries from the user terminal, outputting, to the user terminal, the provided information based on a rating result of the provided information for the potential queries corresponding to each of the queries received from the user terminal.

8. An information providing method by which a computer system including a storage and a control unit that is connected to the storage and that outputs provided information to be provided to a user, the method comprises the steps of:

storing, in the storage, provided information including a content of a product or service, and potential queries that are expected to be input from a user terminal and that are each associated with a plurality of properties including the content of the product or service, wherein the properties are information to be collated, instead of a query input from the user terminal or the potential queries, with the provided information, and the properties are stored as a layered structure including each of the potential queries as a top layer;

extracting, for each of the potential queries, the provided information by collating at least one combination of the properties determined based on the layered structure with the provided information; and upon receiving one or more queries from the user terminal, outputting, to the user terminal, the provided information based on an extracting result of the provided information for the potential queries corresponding to each of the queries received from the user terminal.

9. An information providing method by which a computer system including a storage and a control unit that is connected to the storage and that outputs provided information to be provided to a user, the method comprises the steps of:
storing, in the storage, provided information including a content of a product or service, and potential queries that are expected to be input from a user terminal and that are each associated with a plurality of properties including the content of the product or service, wherein
the properties are collated, instead of a query input from the user terminal or the potential queries, with the provided information, and
the properties are stored as a layered structure including each of the potential queries as a top layer;
extracting, for each of the potential queries, the provided information by collating at least one combination of the properties determined based on the layered structure with the provided information;
rating, for each of the potential queries, the provided information by collating at least one combination of the properties determined based on the layered structure with the provided information;
receiving one or more extracting queries and one or more rating queries that are input from the user terminal; and
outputting, to the user terminal, the provided information based on a rating result of the provided information for the potential queries corresponding to each of the received rating queries, the provided information being extracted for the potential queries corresponding to each of the received extracting queries.

10. A non-transitory computer readable medium storing an information providing program for causing a computer system including a storage and a control unit that is connected to the storage and that performs processing to output provided information to be provided to a user, the program causing the computer system to execute the steps of:
storing, in the storage, provided information including a content of a product or service, and potential queries that are expected to be input from a user terminal and that are each associated with a plurality of properties including the content of the product or service, wherein
the properties are information to be collated, instead of a query input from the user terminal or the potential queries, with the provided information, and
the properties are stored as a layered structure including each of the potential queries as a top layer;
rating, for each of the potential queries, the provided information by collating at least one combination of the properties determined based on the layered structure with the provided information; and
upon receiving one or more queries from the user terminal, outputting, to the user terminal, the provided information based on a rating result of the provided information for the potential queries corresponding to each of the queries received from the user terminal.

11. A non-transitory computer readable medium storing an information providing program for causing a computer system including a storage, and a control unit that is connected to the storage and that performs processing to output provided information to be provided to a user, the program causing the computer system to execute the steps of:
storing, in the storage, provided information including a content of a product or service, and potential queries that are expected to be input from a user terminal and that are each associated with a plurality of properties including the content of the product or service, wherein
the properties are information to be collated, instead of a query input from the user terminal or the potential queries, with the provided information, and
the properties are stored as a layered structure including each of the potential queries as a top layer;
extracting, for each of the potential queries, the provided information by collating at least one combination of the properties determined based on the layered structure with the provided information; and
upon receiving one or more queries from the user terminal, outputting, to the user terminal, the provided information based on an extracting result of the provided information for the potential queries corresponding to each of the queries received from the user terminal.

12. A non-transitory computer readable medium storing an information providing program for causing a computer system including a storage, and a control unit that is connected to the storage and that outputs provided information to be provided to a user, the program causing the computer system to execute the steps of:
storing, in the storage, provided information including a content of a product or service, and potential queries that are expected to be input from a user terminal and that are each associated with a plurality of properties including the content of the product or service, wherein
the properties are information to be collated, instead of a query input from the user terminal or the potential queries, with the provided information, and
the properties are stored as a layered structure including each of the potential queries as a top layer;
extracting, for each of the potential queries, the provided information by collating at least one combination of the properties determined based on the layered structure with the provided information;
rating, for each of the potential queries, the provided information by collating at least one combination of the properties determined based on the layered structure with the provided information;
receiving one or more extracting queries and one or more rating queries that are input from the user terminal; and
outputting, to the user terminal, the provided information based on a rating result of the provided information for the potential queries corresponding to each of the received rating queries, the provided information being extracted for the potential queries corresponding to each of the received extracting queries.

* * * * *